US010281555B2

(12) United States Patent
Loverich et al.

(10) Patent No.: US 10,281,555 B2
(45) Date of Patent: *May 7, 2019

(54) CONCEPTS FOR IDENTIFYING AN ASSET SORT LOCATION

(71) Applicant: United Parcel Service of America, Inc., Atlanta, GA (US)

(72) Inventors: Scott Alan Loverich, Westwood, NJ (US); Ted Abebe, Jersey City, NJ (US); Lawrence A. Lagrosa, Piscataway, NJ (US); Richard Allen Kerslake, Norwood, NJ (US); Jonathan C. Gray, Bridgewater, NJ (US); Carl M. Skonberg, Wyckoff, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 388 days.

This patent is subject to a terminal disclaimer.

(21) Appl. No.: 15/239,286

(22) Filed: Aug. 17, 2016

(65) Prior Publication Data

US 2016/0371647 A1 Dec. 22, 2016

Related U.S. Application Data

(63) Continuation of application No. 14/741,100, filed on Jun. 16, 2015, now Pat. No. 9,658,310.

(51) Int. Cl.
H04W 24/00 (2009.01)
G01S 5/02 (2010.01)
(Continued)

(52) U.S. Cl.
CPC ............ *G01S 5/02* (2013.01); *G06K 7/10297* (2013.01); *G06Q 10/08* (2013.01);
(Continued)

(58) Field of Classification Search
CPC ..... B07C 2301/0016; B07C 2301/0008; G06F 1/163; G06F 1/1698; G06K 2017/0045;
(Continued)

(56) References Cited

U.S. PATENT DOCUMENTS 5,532,521 A 7/1996 Leininger
5,892,441 A 4/1999 Woolley et al.
(Continued)

FOREIGN PATENT DOCUMENTS

EP 1 182 154 A1 2/2002
JP 01 214504 A 11/1989
(Continued)

OTHER PUBLICATIONS

United States Patent and Trademark Office, Notice of Allowance for U.S. Appl. No. 14/741,100, dated Jan. 17, 2017, 12 pages, U.S.A.
(Continued)

*Primary Examiner* — Mahendra Patel
(74) *Attorney, Agent, or Firm* — Shook, Hardy & Bacon L.L.P.

(57) ABSTRACT

Systems and methods for facilitating the sorting of assets to sort locations. In various embodiments, a sort employee scans an asset indicia using a user device, which stores asset data corresponding to the stored asset. As the sort employee nears a sort location (e.g., a delivery vehicle) with the asset and the user device, the user device automatically communicates wirelessly with a sort location receiver to associate the asset data with data indicative of the sort location where the user deposits the asset. In various embodiments, a device may determine whether the user device is proximate the appropriate sort location for the item, and may generate an alert upon a determination that the user device is proximate an incorrect sort location.

18 Claims, 7 Drawing Sheets

(51) Int. Cl.

| | | |
|---|---|---|
| *G06K 7/10* | (2006.01) | |
| *G06Q 10/08* | (2012.01) | |
| *G01S 5/00* | (2006.01) | |
| *G06Q 10/06* | (2012.01) | |
| *G06K 17/00* | (2006.01) | |

(52) U.S. Cl.
CPC ........ *G06Q 10/0833* (2013.01); *G01S 5/0018* (2013.01); *G01S 5/0045* (2013.01); *G01S 5/0284* (2013.01); *G06K 17/0022* (2013.01); *G06Q 10/06313* (2013.01); *G06Q 10/087* (2013.01); *G06Q 10/0835* (2013.01); *Y04S 10/54* (2013.01)

(58) Field of Classification Search
CPC . G06K 17/0022; G01S 5/0045; G01S 5/0284; G01S 5/0018; G06Q 10/0835; G06Q 10/087; G06Q 10/06313; Y04S 10/54
USPC ................. 455/456.1; 1/1; 235/375; 348/94
See application file for complete search history.

(56) References Cited

U.S. PATENT DOCUMENTS

| | | | |
|---|---|---|---|
| 5,908,283 A | 6/1999 | Huang et al. | |
| 6,211,781 B1 | 4/2001 | McDonald | |
| 6,246,882 B1 | 6/2001 | Lachance | |
| 6,370,446 B1 | 4/2002 | Divine | |
| 6,480,108 B2* | 11/2002 | McDonald | G01S 13/75 340/13.26 |
| 6,998,985 B2 | 2/2006 | Reisman et al. | |
| 7,044,387 B2 | 5/2006 | Becker et al. | |
| 7,063,256 B2 | 6/2006 | Anderson et al. | |
| 7,090,134 B2 | 8/2006 | Ramsager | |
| 7,123,149 B2 | 10/2006 | Nowak et al. | |
| 7,221,276 B2* | 5/2007 | Olsen, III | B07C 7/005 340/572.1 |
| 7,272,172 B2 | 9/2007 | Olsen, III et al. | |
| 7,273,172 B2 | 9/2007 | Olsen, III et al. | |
| RE40,073 E | 2/2008 | Breed | |
| 7,372,365 B2 | 5/2008 | Jackson | |
| 7,397,376 B2* | 7/2008 | Jam | G06F 21/34 235/376 |
| 7,474,212 B2 | 1/2009 | Nakagawa et al. | |
| 7,484,663 B2* | 2/2009 | Olsen, III | G06Q 10/06 235/375 |
| 7,649,467 B2 | 1/2010 | Schimmer et al. | |
| 7,667,572 B2 | 2/2010 | Husak et al. | |
| 7,667,575 B2 | 2/2010 | Husak et al. | |
| 7,895,131 B2 | 2/2011 | Kraft | |
| 8,018,336 B2* | 9/2011 | Huang | G06Q 10/08 340/539.13 |
| 8,032,429 B2 | 10/2011 | Shafer | |
| 8,095,304 B2 | 1/2012 | Blanton et al. | |
| 8,234,996 B2* | 8/2012 | Smith | B07B 13/00 116/1 |
| 8,269,629 B2* | 9/2012 | Lyon | G06K 7/0008 340/572.1 |
| 8,611,321 B2 | 12/2013 | Herrala et al. | |
| 8,866,607 B2 | 10/2014 | Velusamy | |
| 9,084,076 B2 | 7/2015 | Breed et al. | |
| 9,156,628 B2 | 10/2015 | Ragusa et al. | |
| 9,218,586 B2 | 12/2015 | Ozkan | |
| 9,860,688 B2 | 1/2018 | Kulkami et al. | |
| 2003/0003777 A1 | 1/2003 | Lesesky et al. | |
| 2003/0060938 A1 | 3/2003 | Duvall | |
| 2003/0120522 A1 | 6/2003 | Uyeki | |
| 2003/0190911 A1 | 10/2003 | Hirano | |
| 2003/0204407 A1 | 10/2003 | Nabors et al. | |
| 2004/0055345 A1 | 3/2004 | Moore | |
| 2004/0069850 A1 | 4/2004 | De Wilde | |
| 2004/0102896 A1 | 5/2004 | Thayer et al. | |
| 2004/0195320 A1* | 10/2004 | Ramsager | B07C 3/18 235/385 |
| 2005/0119786 A1* | 6/2005 | Kadaba | B07C 3/00 700/224 |
| 2005/0209947 A1 | 9/2005 | Shafer | |
| 2006/0022824 A1 | 2/2006 | Olsen et al. | |
| 2009/0085745 A1 | 4/2009 | Gupta et al. | |
| 2009/0091450 A1 | 4/2009 | Deavila | |
| 2009/0160646 A1* | 6/2009 | Mackenzie | G06Q 10/08 340/572.1 |
| 2009/0195384 A1 | 8/2009 | Amidi | |
| 2011/0148625 A1* | 6/2011 | Velusamy | G08B 13/1427 340/539.13 |
| 2011/0227722 A1 | 9/2011 | Salvat, Jr. | |
| 2011/0285535 A1 | 11/2011 | Barwin | |
| 2013/0063251 A1* | 3/2013 | Allen | G06Q 10/0833 340/10.1 |
| 2013/0098989 A1* | 4/2013 | Salzman | G06Q 10/08 235/375 |
| 2013/0099927 A1 | 4/2013 | Kulinets et al. | |
| 2013/0144429 A1* | 6/2013 | Ragusa | B07C 3/00 700/224 |
| 2014/0104036 A1* | 4/2014 | Skonberg | G07C 9/00111 340/5.3 |
| 2014/0209676 A1 | 7/2014 | Reynolds et al. | |
| 2015/0070165 A1 | 3/2015 | East | |
| 2015/0226832 A1 | 8/2015 | Fujiwara | |
| 2015/0262348 A1 | 9/2015 | Salzman et al. | |
| 2016/0180289 A1 | 6/2016 | Siris | |
| 2016/0307152 A1 | 10/2016 | Baldassari et al. | |
| 2016/0314429 A1 | 10/2016 | Gillen et al. | |
| 2016/0370452 A1 | 12/2016 | Loverich et al. | |
| 2016/0371638 A1 | 12/2016 | Loverich et al. | |
| 2016/0371646 A1 | 12/2016 | Loverich et al. | |
| 2017/0108577 A1 | 4/2017 | Loverich et al. | |
| 2018/0240064 A1 | 8/2018 | Mulaosmanovic et al. | |

FOREIGN PATENT DOCUMENTS

| | | | | |
|---|---|---|---|---|
| WO | WO 2000/37958 A2 | 6/2000 | | |
| WO | WO-2004079546 A2 * | 9/2004 | ............... | B07C 3/18 |
| WO | WO-2013072020 A3 * | 7/2013 | ............. | B07C 7/005 |
| WO | 2016/204840 A1 | 12/2016 | | |

OTHER PUBLICATIONS

A Truly Global Tracking System with True Security, All Set Wireless Tracking, Accessed Feb. 2004, p. 1, http://www.allset.se/tracking/solutions.overview.asp. Applicants make no admission that this reference constitutes prior art.

About Hi-G-Tek, Hi-G-Tek, Accessed Feb. 2004, pp. 1-2, http://www.higtek.com/company.htm. Applicants make no admission that this reference constitutes prior art.

All Set System Installed Onboard RoRo Ship, All Set Wireless Tracking, Accessed in Feb. 2004, Dated May 26, 2003, p. 1, http://www.allset.se/tracking/news/Articles/default.asp?articleID=19. Applicants make no admission that this reference constitutes prior art.

All Set Tracking Launches a New Revolutionary Electronic Seal, All Set Marine Security, Accessed in Oct. 2004, Dated Sep. 17, 2002, p.1, http://www.allset.se/security/news/Articles/default.asp?articleID=14. Applicants make no admission that this reference constitutes prior art.

Booton, Jennifer, "Saving Millions by Donning Smart Glasses at Work", FOXBusiness, Aug. 1, 2013, 4 pages, retrieved from http://www.foxbusiness.com/technology/2013/08/01/saving-millions-by-donning-smart-glasses-at-work/, on Nov. 11, 2015.

Cargo Container With Smart Systems Alerts Global Network in Real Time About Security Breaches and In-the-Box Changes, News/Events: Press Releases, Accessed Feb. 2004, pp. 1-4, http://www.savi.com/news_events/2003releases/oct29-03.a.html. Applicants make no admission that this reference constitutes prior art.

Cargo Security Your Source for Supply Chain Cargo Security Products, CGM Security Solutions, Accessed Feb. 2004, pp. 1-2, http://www.cgmsecuritysolutions.com/sw/swchannel/homepage/internet/schomepage.asp?. . . Applicants make no admission that this reference constitutes prior art.

(56) References Cited

OTHER PUBLICATIONS

CIMC and All Set in "Smart and Secure Container" Alliance, All Set Wireless Tracking, Accessed in Feb. 2004, Dated Apr. 4, 2003 pp. 1-2, http://www.allset.se/tracking/news/Articles/default.asp?articleID=16. Applicants make no admission that this reference constitutes prior art.
Freight Containers—Radio-Frequency Communication Protocol for Electronic Seal, ISO Document, Sep. 27, 2003, 23 Pages, Geneva, Switzerland. Applicants make no admission that this reference constitutes prior art.
Hi-G-Tek Diamond are Forever, Hi-G-Tek, Accessed Feb. 2004, p. 1, http://www.higtek.com/images/article.gif. Applicants make no admission that this reference constitutes prior art.
International Searching Authority, International Search Report and Written Opinion for International Application No. PCT/US2016/023382, dated Jun. 7, 2016, 13 pages, European Patent Office, Netherlands.
Kathleen Hickey, Insecurity Over E-Seals, Traffic World, Jan. 19, 2004.
Keep Track of Your Containers, All Set Wireless Tracking, Accessed in Feb. 2004, p. 1-3, http://www.allset.se/tracking/solutions.scenarios.asp. Applicants make no admission that this reference constitutes prior art.
Matus, Morgana, "IKEA'S Augmented Reality 2014 Catalog Lets You Preview Products in Your Apartment!", Inhabitat, Aug. 11, 2013, 8 pages, retrieved from http://inhabitat.com/ikeas-augmented-reality-2014-catalog-lets-you-preview-products-in-your-apartment/ on Nov. 11, 2015.
Our Business, Elogicity, Accessed Feb. 2004, p. 1, http://www.elogicity.com/about_us.htm. Applicants make no admission that this reference constitutes prior art.
Our Products, CGM Security Solutions, Accessed Feb. 2004, pp. 1-4, http://www.cgmsecuritysolutions/com/sw/swchannel/productcatalogcf_v2/internet/Product . . . Applicants make no admission that this reference constitutes prior art.
SAP Enterprise Mobile, "SAP & Vuzix Bring you Augmented Reality Solutions for the Enterprise", May 12, 2013, viewed at https://www.youtube.com/watch?v=9Wv9k_ssLcI#at=40, on Nov. 11, 2015.
SAP Enterprise Mobile, "SAP Mobile and Vuzix Showcase Augmented Reality Solutions for the Enterprise", May 28, 2013, viewed at https://www.youtube.com/watch?v=mY3GCKMitjI, on Nov. 11, 2015.
Savi Search, Savi Technology, Accessed Feb. 2004, pp. 1-2, http://www.savi.com/cgi-bin/sitesearch/search_savi.cgi. Applicants make no admission that this reference constitutes prior art.
Savi Solutions, Savi Technology, Accessed Feb. 2004, p. 1, http://www.savi.com/solutions/index.html. Applicants make no admission that this reference constitutes prior art.
Savi Technology Launches SmartSeal™ Cargo Security System, News/Events: Press Releases, Accessed Feb. 2004, pp. 1-2, http://www.savi.com/news_events/2001releases/oct03-01.html. Applicants make no admission that this reference constitutes prior art.
Secured Cargo, Hi-G-Tek, Accessed Feb. 2004, pp. 1-4, http://www.higtek.com/cargo.htm. Applicants make no admission that this reference constitutes prior art.
Solutions, Elogicity, Accessed Feb. 2004, p. 1, http://www.elogicity.com/solutions.htm. Applicants make no admission that this reference constitutes prior art.
U.S. Treasury Advisory Committee on Commercial Operations of the United States Customs Service (COAC) Subcommittee on US Border Security Technical Advisory Group & Customs Trade Partnership Against Terrorism (C-TPAT), Report on Seal Technologies, Jun. 14, 2002, 37 pages, vol. 7, Scott Smith, Harrison Consulting Group, LLC, National Cargo Security Council. Applicants make no admission that this reference constitutes prior art.
United States Patent and Trademark Office, Office Action for U.S. Appl. No. 14/741,100, dated Apr. 11, 2016, 22 pages, U.S.A.
United States Patent and Trademark Office, Office Action for U.S. Appl. No. 14/741,100, dated Sep. 24, 2015, 20 pages, U.S.A.
Warehouse Operations Committee (Agenda), IARW, Jul. 27, 2003, 44 Pages. Applicants make no admission that this reference constitutes prior art.
We Make Electronic Sealing Easy and Economical, All Set Wireless Tracking, Accessed in Feb. 2004, pp. 1-2, http://www.allset.se/tracking/solutions/products.asp. Applicants make no admission that this reference constitutes prior art.
Notice of Allowance received for U.S. Appl. No. 15/239,299, dated Mar. 28, 2018, 12 pages.
International Search Report and Written Opinion received for PCT Patent Application No. PCT/US2017/067964, dated Feb. 28, 2018, 11 pages.
(IPEA/409) International Preliminary Report on Patentability Chapter II or (IB/373) International Preliminary Report on Patentability Chapter I dated Aug. 24, 2017 for WO Application No. PCT/US16/023382.
Non-Final Rejection dated Dec. 28, 2017 for U.S. Appl. No. 15/239,299.
Written Opinion (Second) for International Application No. PCT/US2016/023382, European Patent Office, Germany, dated May 30, 2017, International Preliminary Examining Authority, 8.
Non-Final Office Action received for U.S. Appl. No. 15/390,109, dated Jan. 10, 2019, 10 pages.

\* cited by examiner

CONCEPTS FOR IDENTIFYING AN ASSET SORT LOCATION

CROSS-REFERENCE TO RELATED APPLICATIONS

This patent application is a continuation of U.S. patent application Ser. No. 14/741,100 filed Jun. 16, 2015, which is incorporated herein by reference in its entirety.

BACKGROUND

For large scale common carriers, it is important to maintain accurate information regarding the location of various assets shipped from a variety of origins to a variety of destinations. The various assets often undergo multiple sort procedures, and are moved from one transportation vehicle to another as each asset moves closer to its intended destination.

The sort procedures often require many employees to sort assets arriving in several vehicles, and these assets may be placed in several locations corresponding to their next stop before reaching an intended destination. The employees may receive some indication of the proper sort location for each asset, such as text printed on each asset or instructions scrolling across a video screen (as described in U.S. patent application Ser. No. 14/204,657, incorporated herein in its entirety). The employee may then place the asset in the proper sort location after receiving the sort location indicator. In various circumstances, the employee may manually identify the location at which the asset is placed, and thereby maintain a record of the location of the asset throughout the shipping process.

However, historical concepts for identifying the location of an asset have been cumbersome, requiring sort employees to individually identify the sort location for each of a plurality of assets being sorted. For example, a sort employee may be required to scan indicia on each asset (e.g., a bar code) and subsequently scan a similar indicia on the sort location in order to associate the asset with the sort location. Alternatively, the sort employee may be required to first scan indicia on a sort location, and then scan a similar indicia on each of one or more assets to be associated with the single sort location. Regardless of the scan order (e.g., asset first or sort location first), the sort employee is required to scan a new sort location indicia each time an asset is to be sorted to a second sort location. Requiring employees to scan multiple indicia significantly reduces sorting efficiency and increases the possibility of employee error. Should an employee fail to scan the proper sort location indicia before placing an asset at a sort location, the asset location may be improperly stored, and such asset may be transported to an incorrect destination. Such events may additionally result in improper reporting from data storage devices.

Such historical systems and methods for maintaining accurate asset location information for a plurality of sorted assets are thus expensive to implement and do not eliminate possible sort errors. Thus, a need exists for an improved system and method for maintaining accurate records of the location of an asset in a sort process.

BRIEF SUMMARY

Various embodiments of the present invention are directed to a system for associating a sorted item with a sort location, wherein the system comprises: (1) one or more location devices associated with a sort location; and (2) a user device configured to be carried by a user. In various embodiments, the user device comprises: (1) a user device memory; and (2) one or more user device computer processors configured to: receive asset identifier data corresponding to an asset; store the asset identifier data corresponding to the asset; and upon being brought within a communication area associated with the sort location, transmitting at least a portion of the asset identifier data to the one or more location devices. In various embodiments, the one or more location devices comprise: (1) a location device memory; and (2) one or more location device computer processors configured to: store location data indicative of the identity of the sort location; receive at least a portion of the asset identifier data transmitted from the user device; and after receiving at least a portion of the asset identifier data transmitted from the user device, associate the asset identifier data and the location data. In various embodiments, the one or more location device computer processors are further configured to: (1) after receiving at least a portion of the asset identifier data transmitted from the user device, receive data indicating whether the sort location is an appropriate sort location for the asset; or (2) after receiving at least a portion of the asset identifier data transmitted from the user device, determine whether the sort location is the appropriate sort location for the asset. Moreover, in various embodiments, the system for associating a sorted item with a sort location may further comprise a control system operatively connected to at least the one or more location devices, the control system comprising: (1) a control system memory; and (2) one or more control system computer processors configured to: receive the portion of the asset identifier data and the location data; determine, based at least in part on the received asset identifier data and the location data, whether the sort location is the appropriate sort location for the asset; upon a determination that the sort location is not the appropriate sort location for the asset, generate mistake data indicative of the determination; upon a determination that the sort location is the appropriate sort location for the asset, generate confirmation data indicative of the determination; and transmit the generated mistake data or confirmation data to the one or more location devices. In various embodiments, the one or more location device computer processors are further configured to transmit the received portion of the asset identifier data and the location data.

Various embodiments of the present invention are directed to a system for associating a sorted item with a sort location, wherein the system comprises: (1) a user device configured to be carried by a user; and (2) one or more location devices associated with a sort location. In various embodiments, the one or more location devices comprise: (1) a location device memory; and (2) one or more location device computer processors configured to: store location data indicative of the identity of the sort location; and transmit at least a portion of the location identifier data to the user device. In various embodiments, the user device comprises: (1) a user device memory; and (2) one or more user device computer processors configured to: receive asset identifier data corresponding to an asset; store the asset identifier data corresponding to the asset; upon being brought within a communication area associated with the sort location, receive the transmitted portion of the location data from the one or more location devices; and after receiving at least a portion of the location data transmitted from the one or more location devices, transmit the asset identifier data and the location data to a control system. In various embodiments, the system for associating a sorted item with a sort location may additionally comprise a control system operatively connected to at least the user device, the control system comprising: (1) a control system memory; and (2) one or more control system computer processors configured to: receive the portion of the asset identifier data and the location data; determine, based at least in part on the received asset identifier data and the location data, whether the sort location is the appropriate sort location for the asset; upon a determination that the sort location is not the appropriate sort location for the asset, generate mistake data indicative of the determination; upon a determination that the sort location is the appropriate sort location for the asset, generate confirmation data indicative of the determination; and transmit the data indicative of the determination to the user device. In various embodiments, the one or more user device computer processors are further configured to transmit the received portion of the location data and the asset identifier data.

Various embodiments of the present invention are directed to a computer-implemented method for associating a sorted item with a sort location, the method comprising steps for: (1) receiving asset identifier data for an asset; (2) associating the asset with a user device; (3) determining the location of the user device relative to a sort location; and (4) after determining that the user device is proximate the sort location, associating the asset identifier data with sort location data corresponding to the sort location. In various embodiments, the computer-implemented method for associating a sorted item with a sort location may additionally comprise steps for: (5) determining an appropriate sort location for the asset; and (6) after determining that the user device is proximate the sort location, determining whether the sort location is the appropriate sort location.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
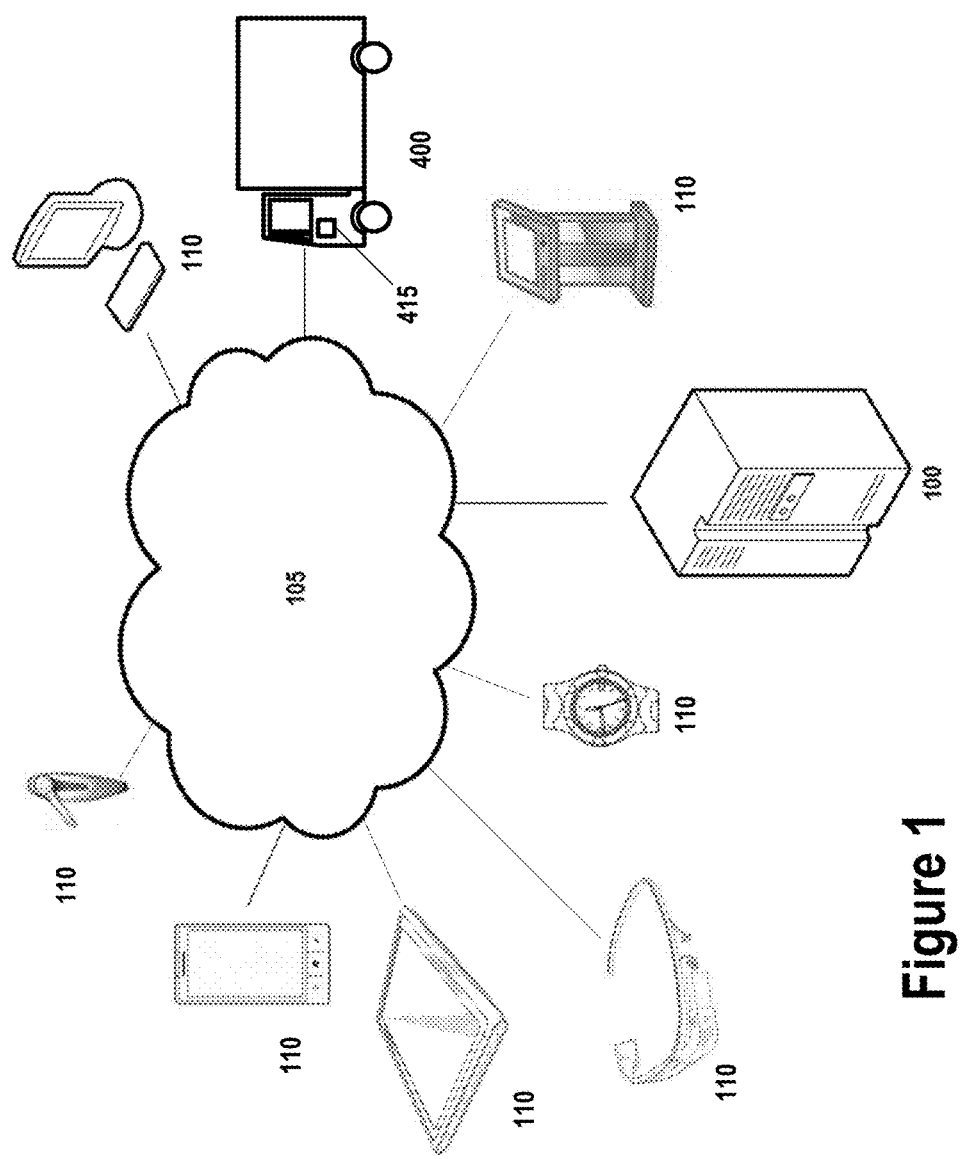
FIG. 1 is an overview of a system that can be used to practice embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

Various embodiments of the present invention are directed to systems and methods for associating an asset with a particular sort location. As used herein, an asset may be an employee, a parcel or group of parcels, a package or group of packages, a box, a crate, a drum, a box strapped to a pallet, and/or the like. As described herein, a sort employee may utilize a user device comprising an indicia reader (e.g., an RFID tag reader, optical scanner, and/or a plurality of indicia readers) to obtain data indicative of the asset identity. The sort employee may then transport the asset to a sort location identified for the asset (e.g., printed on the asset). In various embodiments, the user device may display the proper sort location for the asset via a display device. As the sort employee nears and/or enters a sort location (e.g., enters a delivery vehicle) and thereby enters the effective transmission range of one or more wireless beacons associated with the sort location, the user device may receive a signal from one or more of the wireless beacons indicating the identity of the sort location (e.g., Delivery Vehicle 123). In various embodiments the user device determines whether the received signal satisfies one or more signal criteria, such as a threshold strength requirement and/or whether the user device receives signals from at least a threshold number of beacons. Upon a determination that the user device is at least proximate the sort location associated with the received signals and the one or more signal criteria are satisfied, the user device transmits asset identity data and sort location identity data to a control system, which determines, based on stored sort data, whether the sort location is the appropriate sort location for the asset. If the control system determines the asset is proximate the appropriate sort location, the control system may cause confirmation data to be sent to the user device, which may display a confirmation message to the sort employee. Alternatively, if the control system determines the asset is being placed in an incorrect sort location, the control system may cause mistake data to be sent to the user device, which may display a mistake message indicating the asset is being placed in an improper sort location.

In various embodiments, as the sort employee nears a sort location (e.g., a delivery vehicle) the user device may transmit the received and stored data to a receiver associated with the nearby sort location. If the receiver associated with the sort location determines the asset is being placed in the appropriate sort location (e.g., based at least in part on data stored by a control system), the receiver may cause confirmation data to be sent to the user device, which may display a confirmation message to the sort employee. Alternatively, if the receiver associated with the sort location determines the asset is being placed in an incorrect sort location, the receiver may cause mistake data to be sent to the user device, which may display a mistake message indicating the asset is being placed in an improper sort location.

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Generally, embodiments of the present invention relate to concepts for identifying an appropriate sort location for an asset, and for facilitating the appropriate sorting of each asset. For example, embodiments of the present invention may be used to notify sort personnel of the appropriate sort location for an asset. FIG. 1 is a schematic diagram showing the exemplary communication relationships between components of various embodiments of the present invention. As shown in FIG. 1, the system may include one or more control systems 100, one or more user devices 110, one or more location devices 415, and one or more networks 105. Each of the components of the system may be in electronic communication with one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

A. Exemplary Control System

Figure 2:
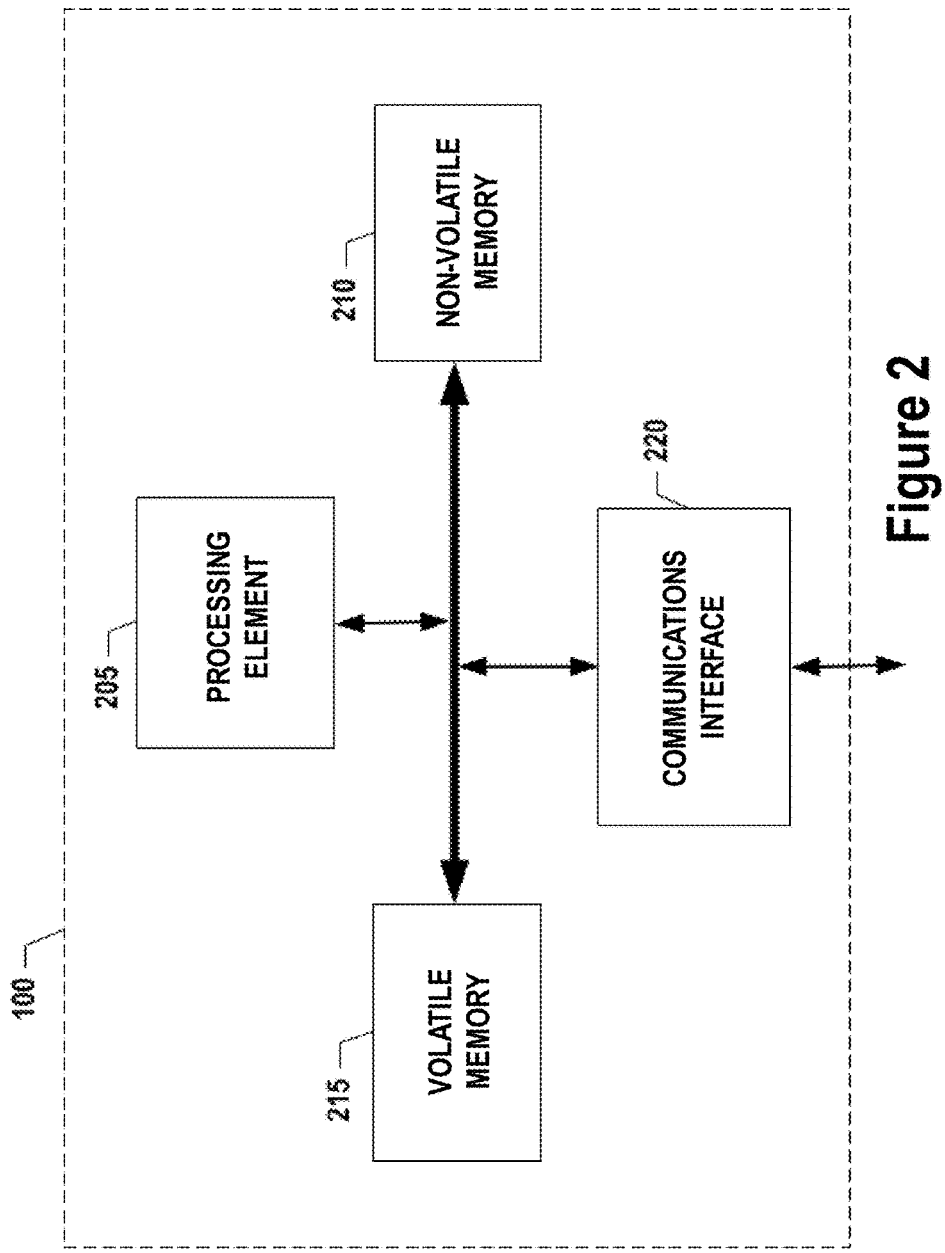
FIG. 2 is an exemplary schematic diagram of a control system according to one embodiment of the present invention.

FIG. 2 provides a schematic of a control system 100 according to one embodiment of the present invention. As described above, the control system 100 may be incorporated into a system as one or more components for providing information regarding the appropriate sort location for each of one or more assets 10. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The control system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the control system 100 may include or be in communication with one or more processing elements 205 (also referred to as processors, processing circuitry, and/or similar terms used herein interchangeably) that communicate with other elements within the control system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the control system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include an operating system, an acquisition module, a sort location module, a matching module, and a notification module. The terms database, database instance, database management system, and/or similar terms used herein interchangeably may refer to a structured collection of records or data that is stored in a computer-readable storage medium, such as via a relational database, hierarchical database, and/or network database.

In one embodiment, the control system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the control system 100 with the assistance of the processing element 205 and operating system.

As indicated, in one embodiment, the control system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the control system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16

(WiMAX), ultra wideband (UWB), infrared (IR) protocols, near field communication (NFC) protocols, Bluetooth™ protocols (e.g., Bluetooth™ Smart), wireless universal serial bus (USB) protocols, and/or any other wireless protocol.

Although not shown, the control system 100 may include or be in communication with one or more input elements, such as a keyboard input, a mouse input, a touch screen/display input, motion input, movement input, audio input, pointing device input, joystick input, keypad input, and/or the like. The control system 100 may also include or be in communication with one or more output elements (not shown), such as audio output, video output, screen/display output, motion output, movement output, and/or the like.

As will be appreciated, one or more of the control system's 100 components may be located remotely from other control system 100 components, such as in a distributed system. Furthermore, one or more of the components may be combined and additional components performing functions described herein may be included in the control system 100. Thus, the control system 100 can be adapted to accommodate a variety of needs and circumstances. As will be recognized, these architectures and descriptions are provided for exemplary purposes only and are not limiting to the various embodiments.

B. Exemplary User Device

Figure 3:
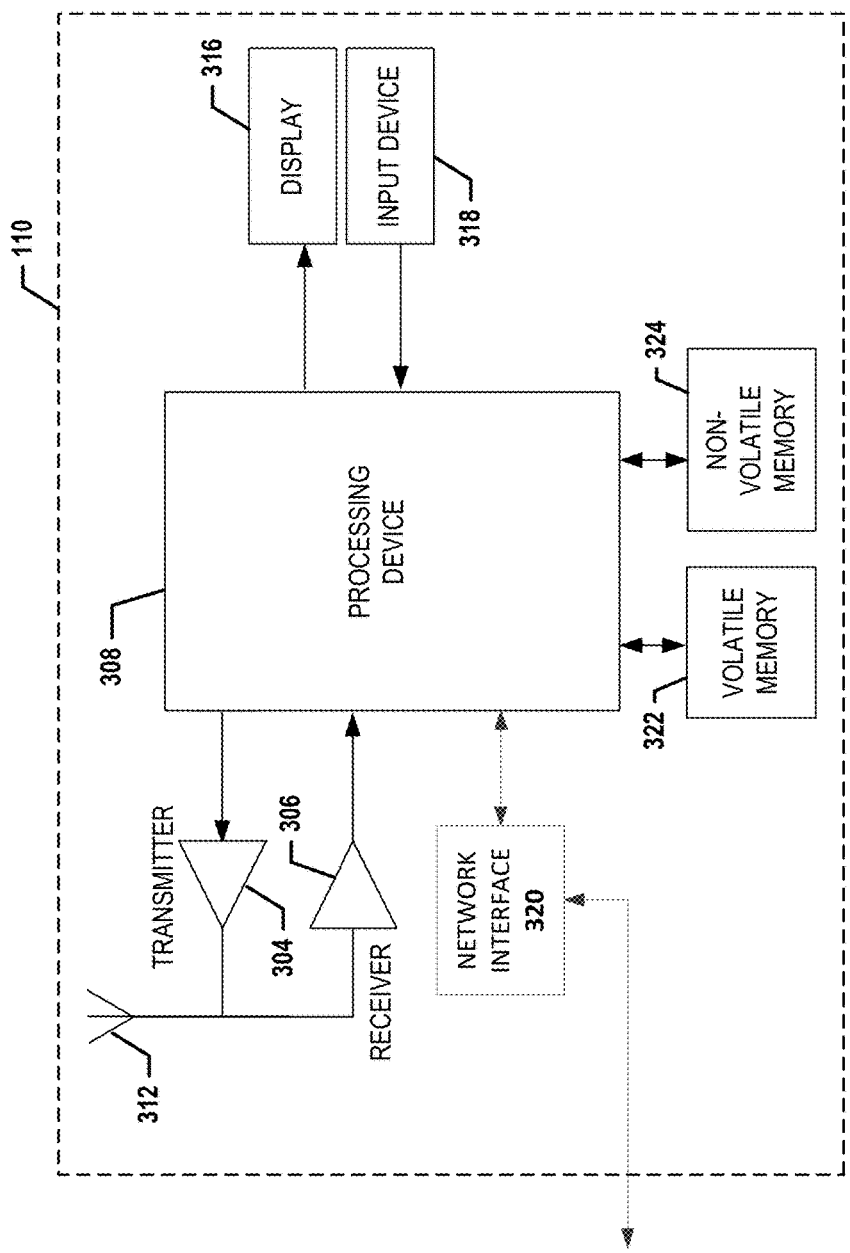
FIG. 3 is an exemplary schematic diagram of a user device according to one embodiment of the present invention.

A user 5 may be an individual (e.g., sort personnel), group of individuals, and/or the like. In various embodiments, a user 5 may operate a user device 110 that includes one or more components that are functionally similar to those of the control system 100. FIG. 3 provides a schematic of a user device 110 according to one embodiment of the present invention. As noted above in referencing the control system 100, the term "computing entity" may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the user device 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the control system 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth™ Smart, USB, and/or the like. Similarly, the user device 110 may operate in accordance with multiple wired communication standards and protocols, such as those described above with regard to the control system 100 via a network interface 320.

Via these communication standards and protocols, the user device 110 can communicate with various other entities (e.g., a location device 415) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system.

According to one embodiment, the user device 110 may include a location determining aspect, device, module, functionality, and/or similar words used herein interchangeably. For example, the user device 110 may include outdoor positioning aspects, such as a location module adapted to acquire, for example, latitude, longitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information may be determined by triangulating the user device 110's position in connection with a variety of other systems, including cellular towers, Wi-Fi access points, and/or the like. Similarly, the user device 110 may include indoor positioning aspects, such as a location module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The user device 110 may also comprise or be associated with an asset indicia reader, device, module, functionality, and/or similar words used herein interchangeably. For example, the user device 110 may include an RFID tag reader configured to receive information from passive RFID tags and/or from active RFID tags associated with an asset 10. The user device 110 may additionally or alternatively include an optical reader configured for receiving information printed on an asset 10. For example, the optical reader may be configured to receive information stored as a bar code, QR code, or other machine-readable code. The asset indicia reader may be integral to the user device 110 and/or may be an external peripheral device in electronic communication with the user device 110. The optical reader may also or alternatively be configured to receive information stored as human readable text, such as characters, character strings, symbols, and/or the like. The user device 110 may utilize the asset indicia reader to receiving information regarding an asset 10 to be sorted.

The user device 110 may also comprise a user interface (that can include a display 316 coupled to a processing element 308 and/or a user input device 318 coupled to a processing element 308). For example, the user interface may be a user application, browser, user interface, and/or similar words used herein interchangeably executing on and/or accessible via the user device 110 to interact with and/or cause display of information from the control system 100, as described herein. The user input interface can comprise any of a number of devices allowing the user device 110 to receive data, such as a keypad (hard or soft), a touch display, voice or motion interfaces, or other input device. In embodiments including a keypad, the keypad can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the control system 100, location device 415, and/or various other computing entities.

In another embodiment, the user device 110 may include one or more components or functionality that are the same or similar to those of the control system 100, as described in greater detail above. As will be recognized, these architectures and descriptions are provided for exemplary purposes only and are not limiting to the various embodiments.

C. Exemplary Location Device

In various embodiments, one or more sort locations 400 may be associated with one or more location devices 415 configured for identifying one or more assets 10 being sorted to each sort location 400. As non-limiting examples, such sort locations 400 may include one or more vehicles (e.g., aircraft, tractor-trailer, cargo container, local delivery vehicles, and/or the like), pallets, identified areas within a building, bins, chutes, conveyor belts, shelves, and/or the like. The one or more location devices 415 may be attached to a sort location 400 (e.g., attached to a vehicle) or located within a sort location 400. Alternatively the one or more location devices 415 may be located adjacent to a sort location 400 or otherwise proximate the sort location 400. In various embodiments, a location device 415 may be located proximate to an area designated to store the sort location 400. For example, a location device 415 may be located above each of a plurality of parking areas designated for one or more delivery vehicles.

In various embodiments, the one or more location devices 415 may include components functionally similar to the control system 100 and/or the user device 110. As noted above in referencing the control system 100, the term "computing entity" may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Like the user device shown schematically in FIG. 3, the location device 415 can include an antenna, a transmitter (e.g., radio), a receiver (e.g., radio), and a processing element (e.g., CPLDs, microprocessors, multi-core processors, coprocessing entities, ASIPs, microcontrollers, and/or controllers) that provides signals to and receives signals from the transmitter and receiver, respectively.

The signals provided to and received from the transmitter and the receiver, respectively, may include signaling information in accordance with air interface standards of applicable wireless systems. In this regard, the location device 415 may be capable of operating with one or more air interface standards, communication protocols, modulation types, and access types. More particularly, the location device 415 may operate in accordance with any of a number of wireless communication standards and protocols, such as those described above with regard to the control system 100. In a particular embodiment, the location device 415 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth™, USB, and/or the like. Similarly, the location device 415 may operate in accordance with multiple wired communication standards and protocols, such as those described above with regard to the control system 100 via a network interface.

Via these communication standards and protocols, the location device 415 can communicate with various other entities (e.g., the user device 110) using concepts such as USSD, SMS, MMS, DTMF, and/or SIM dialer. The location device 415 can also download changes, add-ons, and updates, for instance, to its firmware, software (e.g., including executable instructions, applications, program modules), and operating system.

According to one embodiment, the location device 415 may include a location determining aspect, device, module, functionality, and/or similar words used herein interchangeably. For example, the location device 415 may include outdoor positioning aspects, such as a location module adapted to acquire, for example, latitude, longitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information may be determined by triangulating the location device 415's position in connection with a variety of other systems, including cellular towers, Wi-Fi access points, and/or the like. Similarly, the location device 415 may include indoor positioning aspects, such as a location module adapted to acquire, for example, latitude, longitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, BLE transmitters, NFC transmitters, and/or the like. These indoor positioning aspects can be used in a variety of settings to determine the location of someone or something to within inches or centimeters.

The location device 415 can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the location device 415. As indicated, this may include a user application that is resident on the entity or accessible through a browser or other user interface for communicating with the control system 100, user device 110, and/or various other computing entities.

In another embodiment, the location device 415 may include one or more components or functionality that are the same or similar to those of the control system 100 or user device 110, as described in greater detail above. As will be recognized, these architectures and descriptions are provided for exemplary purposes only and are not limiting to the various embodiments.

IV. EXEMPLARY CONTROL SYSTEM CONFIGURATION

In various embodiments, the control system 100 may comprise a plurality of modules, each module configured to perform at least a portion of the functions associated with the methods described herein. For example, the control system 100 may comprise an acquisition module, a sort location module, a matching module, and a notification module. Although described herein as being individual components of the control system 100, the various modules may operate on a combination of one or more devices (e.g., the user device 110, location device 415, and/or the control system 100), such that each device performs the functions of one or more modules.

A. Acquisition Module

In various embodiments, the acquisition module may be configured to obtain asset identifier data regarding an asset 10 to be sorted. In various embodiments, the asset identifier data may comprise a unique asset identifier (e.g., a tracking code), data defining the one or more appropriate sort locations 400 for the asset 10 as it moves between an origin and a destination, and/or the like. As a non-limiting example, the acquisition module may be configured to obtain data from the user device 110 (e.g., via the indicia reader). In various embodiments, the data received from the user device 110 may include the entirety of the asset identifier data and therefore the acquisition module need only receive asset identifier data from the user device 110. However, in various embodiments, the data received from the user device 110 may comprise only a portion of the asset identifier data, and the acquisition module may be configured to obtain the remainder of the asset identifier data from one or more other sources. As a non-limiting example, the acquisition module may be configured to search one or more databases in communication with the control system 100 for asset identifier data corresponding to the data received from the user device 110. The acquisition module may additionally be configured to receive and store at least a portion of the asset identifier data corresponding to the asset 10 that is stored in one or more databases.

In various embodiments, the acquisition module may be configured to transmit at least a portion of the asset identifier data to one or more devices (e.g., the user device 110, the location device 415, and/or the control system 100) and/or one or more modules (e.g., the sort location module, the matching module, and/or the notification module). Moreover, upon receiving the asset identifier data regarding an asset 10 to be sorted, the acquisition module may be configured to link or otherwise associate the user device 110 and the asset identifier data. As will be described in greater detail herein, the user device 110 may be associated with the asset identifier data by storing at least a portion of the asset identifier data in a memory associated with the user device 110.

B. Sort Location Module

The sort location module may be configured to receive asset identifier data from the acquisition module. The sort location module may be configured to ascertain the appropriate sort location for the asset 10 based at least in part on the asset identifier data. In various embodiments, each of the plurality of sort locations 400 may be identified by a unique sort location identifier. The unique sort location identifier may comprise a unique character string individually identifying each of the plurality of sort locations 400. Alternatively, the sort location module may be configured to determine the appropriate sort location based at least in part on the asset identifier data and sort location data. In various embodiments, the sort location data may define any subsequent processing to be performed on assets 10 within each sort location 400, and may comprise a unique sort location identifier for each of the plurality of sort locations 400 the assets 10 will pass through. In various embodiments, the sort location module may determine whether the processing to be performed on assets 10 in each of the plurality of sort locations 400 (as defined in the sort location data) will move the asset 10 closer to its final destination. In various embodiments, the sort location module may determine whether the processing steps to be performed on the assets 10 in each of the sort locations 400 complies with the service level corresponding to the asset 10. As a non-limiting example, the sort location module may determine the appropriate sort location for an asset 10 to be delivered to 123 Main Street, Atlanta, Ga. is a delivery vehicle that will deliver other assets 10 to the same address or nearby addresses (e.g., along the same delivery route). As a second non-limiting example, the sort location module may determine the appropriate sort location for an asset 10 to be delivered to 345 Broad Street, Los Angeles, Calif. via Next Day Delivery is a pallet to be loaded onto a plane destined for Los Angeles, Calif.

After determining the appropriate sort location for the asset 10, the sort location module may be configured to transmit data defining the appropriate sort location to one or more devices (e.g., the user device 110, the location device 415, and/or the control system 100) and/or modules (e.g., the matching module and/or the notification module).

C. Matching Module

The matching module may be configured to receive asset identifier data from the acquisition module and/or the sort location module, and may be configured to receive data defining the appropriate sort location from the sort location module. Moreover, the matching module may be configured to receive data indicating the user device 110 (and consequently the asset 10) is proximate a first sort location 400. In various embodiments, the user device 110 and/or one or more location devices 415 may determine that the user device 110 is within a communication area 405 corresponding to the one or more location devices 415, and is therefore proximate to the first sort location 400 corresponding to the one or more location devices 415. As a non-limiting example, each of the one or more location devices 415 may be embodied as a wireless beacon broadcasting a signal indicating the identity of the associated sort location. In various embodiments, each sort location may be associated with a plurality of such location devices 415. The user device 110 may be configured to receive the wireless signals broadcast from the plurality of location devices 415 and determine whether the received signal satisfies one or more signal criteria. For example, the user device 110 may determine whether the signal received from each of the plurality of location devices 415 satisfies a predetermined signal strength threshold and/or may determine whether wireless signals are received from at least a minimum number of location devices 415 broadcasting data regarding a single sort location. Upon a determination that the signal received from the plurality of location devices 415 satisfies each of the signal criteria, the user device 110 may transmit asset identity data and sort location identity data to the matching module to determine whether the user device 110 is proximate the appropriate sort location for the asset.

Upon determining the user device 110 is proximate a first sort location 400, at least one of the user device 110 and the one or more location devices 415 may transmit data indicating the user device 110 is proximate the first sort location 400 to the matching module. The data indicating that the user device 110 is proximate the first sort location 400 may also be indicative of the identity of the first sort location 400 (e.g., the data may comprise the unique sort location identifier corresponding to the first sort location 400). The matching module may be configured to determine whether the first sort location 400 is the appropriate sort location based at least in part on the received data defining the appropriate sort location.

In various embodiments, the matching module may be configured to transmit data indicating whether the first sort location 400 is the appropriate sort location to one or more devices (the user device 110 and/or the one or more location devices 415) and/or one or more modules (e.g., the notification module). For example, upon a determination that the proximate sort location 400 is the appropriate sort location, the matching module may generate and transmit confirmation data to the notification module for additional processing. Alternatively, upon a determination that the proximate sort location 400 is not the appropriate sort location, the matching module may generate and transmit mistake data to the notification module for additional processing.

In various embodiments, the matching module may additionally be configured to link and/or associate the asset identifier data and the sort location identifier data corresponding to the sort location 400 at which the asset is deposited. As a non-limiting example, the asset identifier data may be updated to reflect the link between the asset identifier data and the sort location identifier data. Alternatively, the sort location identifier data may be updated to reflect each of the assets associated with the sort location 400. As described herein, the matching module may be configured to link the asset identifier data and the sort location identifier data upon the occurrence of a triggering event.

To link and/or associate the asset identifier data and the sort location identifier data corresponding to the sort location 400 at which the asset it deposited, the matching module may receive at least a portion of the asset identifier data and at least a portion of the location data and associate these data in, for example, one or more databases. As previously noted, however, the matching module may be configured to associate the asset identifier data and the sort location data by updating at least one of the asset identifier data or the sort location data to reflect the association. Again, the updated data may be stored in one or more databases.

D. Notification Module

In various embodiments, the notification module may receive data indicating whether the first sort location 400 is the appropriate sort location from the matching module. As described herein, the notification module may cause one or more alerts to be generated in order to notify the user 5 (e.g., sort personnel) whether the asset 10 should be deposited in the first sort location 400. For example, the notification module may be configured to transmit confirmation data and/or mistake data to the user device 110 and/or the one or more location devices 415 in order to cause at least one of the devices to generate an alert discernible by the user 5 (e.g., sort personnel) indicative of the appropriate sort location for the asset 10.

In various embodiments, the notification module may cause the user device 110 to display a confirmation message upon a determination that the first sort location 400 is the appropriate sort location. As non-limiting examples, the confirmation message may indicate that the first sort location 400 is the appropriate sort location, or the confirmation message may indicate that an asset has been deposited at the appropriate sort location. Alternatively, the notification module may cause a light located near the first sort location 400 to illuminate upon a determination that the first sort location 400 is the appropriate sort location. As yet another non-limiting example, the notification module may cause the user device 110 to display a message upon a determination that the first sort location 400 is not the appropriate sort location. Similarly, the notification module may cause a light located near the first sort location 400 to illuminate upon a determination that the proximate sort location 400 is not the appropriate sort location. In various embodiments, the notification module may cause one or more sounds to be generated, one or more lights to illuminate, one or more mechanical assemblies to move, and/or other processes discernible by a user 5 to operate and thus indicate to the user 5 whether the first sort location 400 is the appropriate sort location.

Moreover, the notification module may be configured to generate an alert after associating asset identifier data with location data. The notification module may be configured to generate an alert to inform the user 5 (e.g., sort personnel) or other users regarding asset identifier data being associated with location data. As a non-limiting example, the notification module may be configured to cause a message to be displayed via the user device 110 in order to notify the user 5 that asset identifier data corresponding to an asset 10 has been associated with location data corresponding to a sort location. Thus, the notification module may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

V. EXEMPLARY SYSTEM OPERATION

As will be described in greater detail herein, the various entities illustrated in FIG. 1 may operate to provide a user 5 (e.g., sort personnel) information regarding the appropriate sort location to deposit an asset 10.

A. Exemplary User Device Operation

Figure 4:
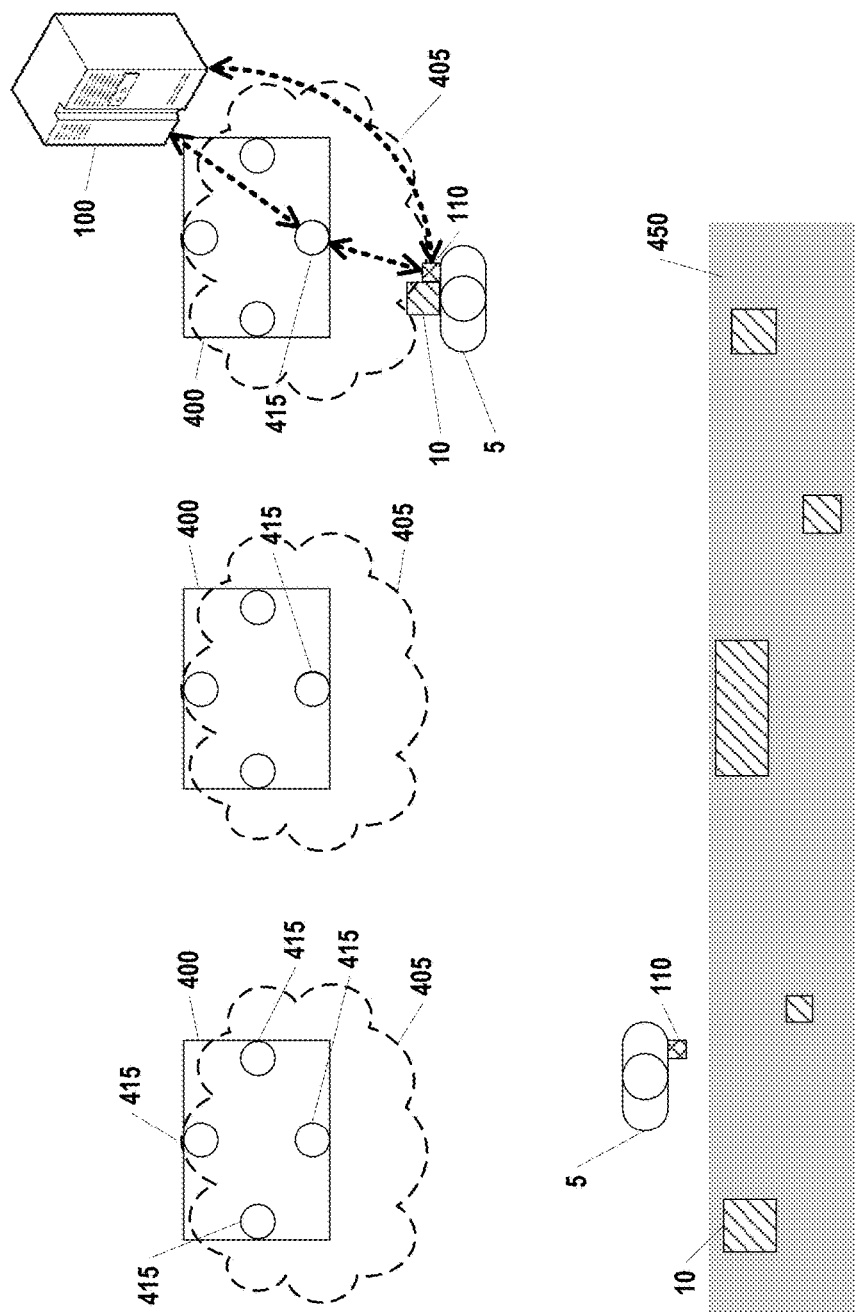
FIG. 4 is an exemplary schematic of a facility in which assets are sorted according to one embodiment of the present invention.

FIG. 4 illustrates an exemplary environment in which assets 10 are moved from an intake location 450 (e.g., an unsorted location) to one or more sort locations 400. In various embodiments, a user 5 (e.g., sort personnel) may utilize a user device 110 as described herein while transporting assets 10 from an intake location 450 to one or more sort locations 400. As described herein, the user device 110 may be configured for receiving information regarding a particular asset 10 to be sorted, and for informing the user 5 whether the asset 10 is being sorted to the appropriate sort location.

Figure 5:
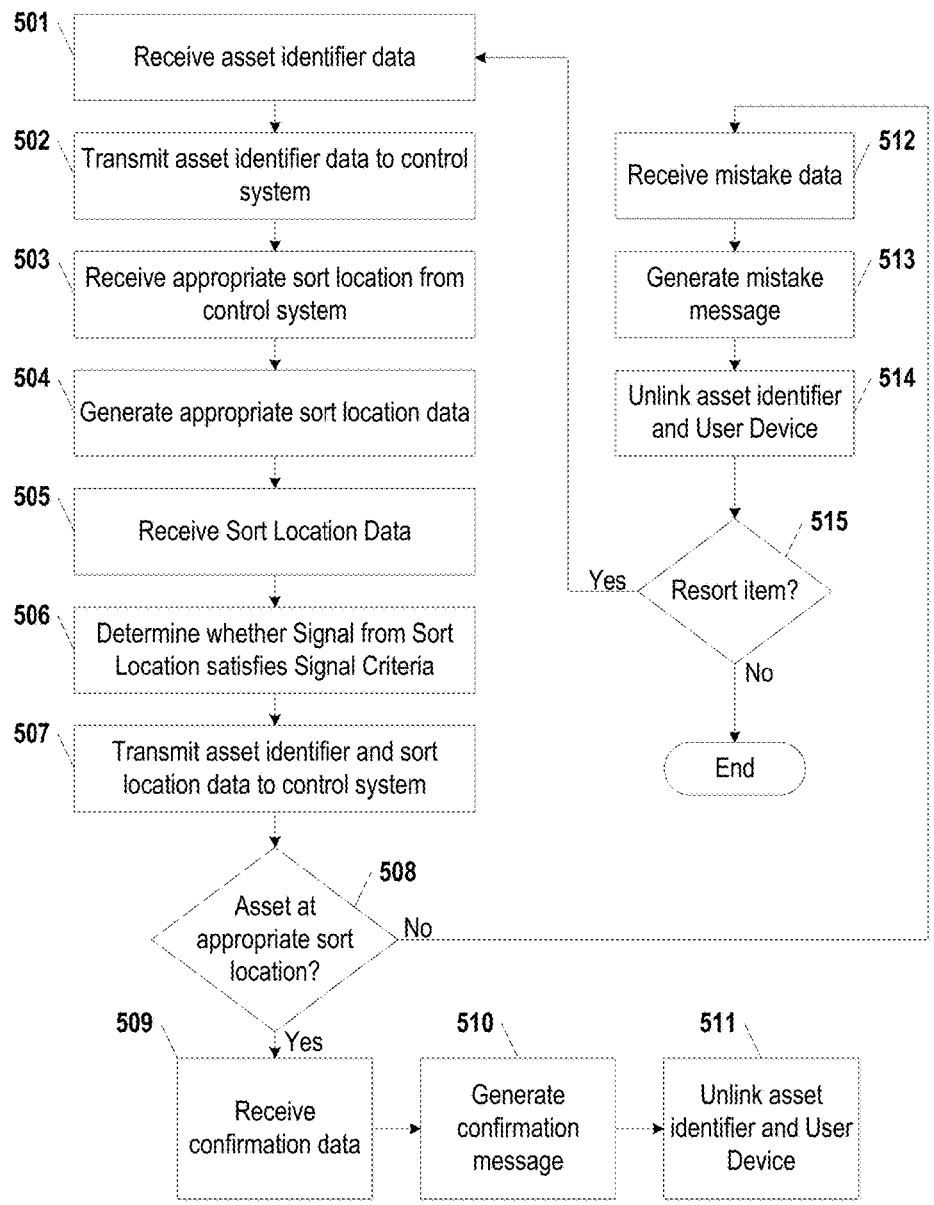
FIG. 5 is a flowchart illustrating operations and processes performed by a user device according to one embodiment of the present invention.

FIG. 5 illustrates exemplary steps carried out by the user device 110 according to various embodiments of the present invention. As illustrated in FIG. 5, the user device 110 may be configured to receive asset identifier data associated with an asset 10 to be sorted at Block 501. In various embodiments, the user 5 may utilize the indicia reader to scan, read, or otherwise receive asset identifier data from the asset 10. As noted herein, the asset identifier data may be printed or otherwise affixed to the asset 10 to be sorted. In various embodiments, the user device 110 may receive asset identifier data by, for example, reading an RFID tag associated with the asset 10, reading a bar code, QR code, character string, and/or symbol printed on the asset 10 or otherwise associated with the asset 10, and/or otherwise obtaining asset identifier data regarding the asset 10 to be sorted. The user device 110 may be configured to store the asset identifier data in a memory associated with the user device for later retrieval and use.

As noted above, in various embodiments, the asset identifier data may comprise a unique asset identifier, such as a tracking code or other unique identifier. Alternatively or additionally, the asset identifier data may comprise origin identifying data (e.g., origin address, shipper identity, and/or the like), destination identifying data (e.g., destination address, recipient identity, and/or the like), service level data (e.g., Same Day shipping, Next Day Air, Second Day Air, 3 Day Select, Ground shipping, and/or the like), and/or the like. Moreover, in various embodiments, the asset identifier data may comprise more detailed data regarding the asset 10 to be sorted, such as sort locations 400 for each intermediate shipping point. In various embodiments, the asset identifier data may be updated at various times during the shipping process. For example, after determining an appropriate sort location for the asset 10 to be sorted (a process described in greater detail herein), the asset identifier data may be updated to reflect the appropriate sort location. Alternatively, the asset identifier data may be fixed after being created, such that it is not updated with new and/or alternative information during shipment.

After receiving asset identifier data regarding the asset 10 to be sorted, the user device 110 may be configured to transmit the asset identifier data to the control system 100 at Block 502. The control system 100 may be configured to determine an appropriate sort location for the asset 10 based at least in part on the asset identifier data. The control system 100 may be configured to transmit data identifying the appropriate sort location to the user device 110, and the user device may be configured to receive data indicative of the appropriate sort location from the control system 100 at Block 503. In various embodiments, the asset identifier data may be updated to reflect the appropriate sort location. The control system 100 may be configured to update the asset identifier data stored within an asset identifier database. Alternatively, after receiving the appropriate sort location from the control system 100, the user device 110 may be configured to update the asset identifier data stored within a memory associated with the user device 110.

In various embodiments, the user device 110 may be configured to inform the user 5 (e.g., sort personnel) of the appropriate sort location for the asset 10 at Block 504. As a non-limiting example, the user device 110 may cause display of the appropriate sort location via the display 316 to the user 5 (e.g., sort personnel) or may audibly inform the user 5 of the appropriate sort location for the asset 10. The displayed sort location 400 may comprise a sort location identifier, such as a symbol, character string, and/or the like. However, in various embodiments, information indicative of the appropriate sort location may be printed on the asset 10 (e.g., directly onto a surface of the asset 10, onto a sticker or other label secured to the asset 10, and/or the like). In various embodiments, the user device 110 may not display the appropriate sort location for the asset 10, and accordingly the user 5 may rely on the information printed on the asset 10 to determine the appropriate sort location. Accordingly, in such embodiments, after receiving asset identifier data as illustrated in Block 501 of FIG. 5, the user device may be configured to thereafter await receipt of sort location data as illustrated in Block 505.

The user 5 (e.g., sort personnel) may transport the asset 10 and the user device 110 to a sort location 400. As the user 5 nears the sort location 400 (e.g., enters the communication area 405 corresponding to the sort location 400), the user device 110 may establish a wireless communication connection with one or more location devices 415 associated with the sort location 400 and receive sort location data from the one or more location devices 415 at Block 505. For example, the user device 110 and location devices 415 may be configured to establish a communication connection when the user device 110 is within a predetermined communication area 405, which may be defined as an area within a predetermined distance of each of the one or more location devices 415 (e.g., via Bluetooth™, NFC, Wi-Fi, and/or the like). Such communication connection may be a one-way communication connection in which signals are broadcast from each of the one or more location devices 415 to the user device 110. Such predetermined distance may be established based on the effective communication range of the wireless communication protocol utilized. As a non-limiting example, the user device 110 and each location device 415 may be configured to communicate using a Bluetooth™ Smart communication protocol with an effective communication range of approximately 8 feet, although other communication protocols with other effective ranges may be used. Therefore, the user device 110 and each of the one or more location devices 415 may be configured to establish a communication connection whenever the user device 110 is within the effective communication range of the utilized communication protocol. Alternatively, the size, shape, and location of the communication area 405 may be established based on other factors, such as the distance between sort locations 400, the distance between the intake location 450 and the one or more sort locations 400, and/or the like. The communication area 405 may be defined as an area within a geofenced area, and the user device 110 and the one or more location devices 415 may establish a communication connection after the user device 110 enters the communication area 405. In various embodiments, the user device 110 is configured to maintain a communication connection with a plurality of location devices 415 concurrently.

As a non-limiting example, each sort location 400 may be associated with a plurality of location devices 415 embodied as wireless beacons each configured to broadcast data indicating the identity of the associated sort location. Such location devices 415 may be located proximate to the sort location 400, and may be arranged such that the effective communication range of each of the plurality of the location devices 415 overlaps within the associated sort location 400 to establish the communication area 405. As the user device 110 is moved proximate the sort location, the user device 110 receives the signals broadcast by one or more of the location devices 415 at Block 505. At Block 506 the user device 110 may determine whether the received signals satisfy one or more signal criteria in order to validate the identity of the proximate sort location. For example, the user device 110 may determine whether the signal strength received from each of the one or more location devices 415 satisfies a predetermined signal strength threshold (e.g., the signal strength threshold may define a minimum signal strength). Moreover, the user device 110 may determine whether a signal is received from a minimum number of location devices 415 associated with a particular sort location. As yet another example, the user device 110 may determine whether a signal indicating that the user device is proximate Delivery Vehicle 123 from at least 3 location devices 415 each broadcasting the identity of Delivery Vehicle 123. In various embodiments, the user device 110 may determine whether two or more signal criteria are satisfied (e.g., the signal strength threshold and the minimum number of location devices 415). Such criteria may impede false positive determinations that the user device 110 is proximate a particular sort location. For example, as a user approaches a plurality of sort locations, the user device 110 may receive weak signals from at least one location device 415 associated with each of a plurality of sort locations. By ensuring that the signal strength of the signal received from a particular location device 415 satisfies a predetermined threshold, weak signals received from location devices 415 associated with distant sort locations may be disregarded. Moreover, by ensuring that signals are received from a minimum number of location devices 415 associated with a particular sort location, the user device 110 may ensure that it is positioned within or proximate a single sort location, rather than between two or more sort locations. In various embodiments, the user device 110 may be configured to periodically (e.g., every 5 seconds) and/or continuously determine whether the one or more signal criteria are satisfied.

Upon determining that the signals received by the user device 110 satisfy the one or more signal criteria, the user device 110 may transmit the sort location identity data received from the one or more location devices 415 and the asset identity data to the control system 100 at Block 506. The control system 100 may then determine whether the user device 110 is proximate the appropriate sort location for the asset. The control system 100 may be configured to transmit an indication of whether the user device 110 is proximate the appropriate sort location to the user device 110.

Alternatively, after the user device 110 enters the communication area 405, the user device 110 may be configured to transmit the asset identifier to the location devices 415. In various embodiments wherein the asset identifier data comprises data regarding the appropriate sort location for the asset 10, the location devices 415 may be configured to transmit data indicating whether the user device 110, and consequently the user 5 and asset 10, is proximate the appropriate sort location (e.g., within the communication area 405) to the user device 110. In various embodiments, the one or more location devices 415 may be configured to transmit at least a portion of the asset identifier data to the control system 100, which may be configured to determine whether the user device 110 is proximate the appropriate sort location. The control system 100 may be configured to transmit an indication of whether the user device 110 is proximate the appropriate sort location to the one or more location devices 415, which may be configured to transmit an indication of whether the user device is proximate the appropriate sort location to the user device 110. Referring again to FIG. 5, upon a determination that the user device 110 is proximate an incorrect sort location 400 (e.g., within a communication area 405 corresponding to a final delivery vehicle that does not travel to the asset's 10 destination address) at Block 508, at least one of the control system 100 and/or the one or more location devices 415 may be configured to transmit mistake data to the user device 110, and the user device 110 may be configured to receive the mistake data at Block 512. Upon receiving the mistake data, the user device 110 may be configured to generate a mistake message to inform the user 5 (e.g., sort personnel) that the asset 10 is proximate an incorrect sort location 400 at Block 513. As a non-limiting example, the user device 110 may be configured to cause display of a mistake message via the display 316, emit a warning sound, and/or otherwise warn the user 5 that the user device 110 is proximate an incorrect sort location 400. Thus, as a non-limiting example, mistake data may be generated if the user 5 approaches an incorrect sort location and/or enters an incorrect sort location. As indicated at Block 514, the user device 110 may unlink the asset identifier data and the user device 110 such that the asset identifier data is cleared from the memory of the user device 110 such that the asset identifier data is no longer stored in the memory of the user device 110 upon the occurrence of a triggering event. Such triggering event may be, for example, reading, scanning, or otherwise receiving asset identifier data (e.g., via the indicia reader device) while the user device 110 is in the communication area 405, losing connection between one or more location devices 415 and the user device 110 (e.g., upon a determination that the wireless communication connection between the plurality of location devices 415 and the user device 110 no longer satisfy the signal criteria), after receiving asset identifier data regarding a second asset 10, and/or otherwise after a triggering event. In various embodiments, the user device 110 may be configured to reset, or otherwise dissociate the asset identified data from the user device 110 upon the occurrence of a triggering event. Accordingly, in the event that the user device 110 is located proximate an incorrect sort location, the user may be required to rescan the indicia associated with the asset 10 to relink the asset identified data with the user device 110 before transporting the asset 10 to the appropriate sort location.

At Block 515, the user 5 (e.g., sort personnel) may transport the asset 10 out of the communication area 405 corresponding to the incorrect sort location 400, and may transport the asset 10 to the appropriate sort location. After removing the asset 10 (and consequently the user device 110) from the communication area 405 associated with the incorrect sort location 400, and after the user device 110 unlinks the asset identifier data from the user device 110, the process reverts to Block 501. However, in various embodiments, the user device 110 may be configured to associate the asset identifier data with sort location data at Block 515, and the process may end. As a non-limiting example, the user device 110 may be configured to associate the asset identifier data with the sort location identifier data upon the occurrence of a triggering event. Such triggering event may be, for example, reading, scanning, or otherwise receiving asset identifier data (e.g., via the indicia reader device) while the user device 110 is in the communication area 405, losing connection between one or more location devices 415 and the user device 110 (e.g., upon a determination that the wireless communication connection between the plurality of location devices 415 and the user device 110 no longer satisfy the signal criteria), after receiving asset identifier data regarding a second asset 10, and/or otherwise after a triggering event. In various embodiments, the user device 110 may be configured to reset, or otherwise dissociate the asset identifier data from the user device 110 upon the occurrence of a triggering event.

The user device 110 may also or alternatively be configured to reset and/or unlink the asset identifier data after a predetermined amount of time after receiving the mistake data; after scanning, reading, or otherwise receiving the asset identifier data regarding the asset 10 (e.g., via the indicia reader) while the user device 110 is located within the communication area 405, after receiving asset identifier data regarding a second asset 10; and/or otherwise after a triggering event. The user device 110 may be utilized to receive asset identifier data regarding a subsequent asset 10 to be sorted, and the process is repeated.

Referring again to Block 508, the process may proceed after transmission of the asset identifier data and/or sort location identifier data to the one or more location devices 415 and/or control system 100 (illustrated as Block 507) with reference to Blocks 509-511 if the user 5 approaches the appropriate sort location. Upon a determination that the user device 110 is proximate and/or within the appropriate sort location (e.g., within the communication area 405 corresponding to the appropriate sort location), the control system 100 and/or the one or more location devices 415 may be configured to transmit confirmation data to the user device 110 indicating the user device 110 is proximate the appropriate sort location for the asset 10, and the user device 110 may be configured to receive the confirmation data at Block 509. Upon receiving the confirmation data, the user device 110 may be configured to generate a confirmation message to inform the user 5 (e.g., sort personnel) that the asset 10 is near the appropriate sort location at Block 510. As a non-limiting example, the user device 110 may be configured to cause display of a confirmation message via the display 316, emit a confirmation sound, and/or otherwise provide the user 5 with confirmation that the user device 110 is proximate the appropriate sort location.

In various embodiments, after receiving the confirmation data, the user device 110 may be configured to associate the asset identifier data with a sort location identifier. Alternatively, the asset identifier data may be transmitted to the control system 100, which may be configured to associate the asset identifier data with the sort location data.

After receiving the confirmation data and/or after another triggering event, the user device 110 may be configured to dissociate, unlink, delete, clear, or otherwise remove the asset identifier data regarding the recently sorted asset 10 from the active memory of the user device 110 at Block 511. The user device 110 may be configured to unlink the asset identifier data after the user device 110 determines that the one or more signal criteria are no longer satisfied, after a predetermined amount of time after receiving the confirmation data; after scanning, reading, or otherwise receiving the asset identifier data regarding the asset 10 (e.g., via the indicia reader) while the user device 110 is located within the communication area 405; after receiving asset identifier data regarding a second asset 10; after receiving user input via the user device 110; and/or otherwise after a triggering event. The user device 110 may be utilized to receive asset identifier data regarding a subsequent asset 10 to be sorted, and the process may be repeated.

The user device 110 may have any of a variety of configurations. For example, the user device 110 may not transmit or receive data (e.g., asset identifier data) from the control system 100, and may instead only transmit and receive data from one or more location devices 415. Moreover, the user device 110 may not generate and/or display appropriate sort location data, and instead the user 5 (e.g., sort personnel) may be required to ascertain the appropriate sort location for an asset 10 without a reminder or other indication from the user device 110. Alternatively, the appropriate sort location may be printed on the asset 10 in human readable form such that the user 5 (e.g., sort personnel) may determine the appropriate sort location based on information printed on or otherwise physically associated with the asset 10.

As yet another alternative, the user device 110 need not establish a new connection with one or more proximate location devices 415 each time the user device enters a connection area 405. In various embodiments, the user device 110 may maintain connections with each of the plurality of location devices 415 associated with each of the plurality of sort locations 400. Upon a determination that the user device 110 enters the connection area 405, the user device may be configured to transmit asset identifier data to the one or more location devices 415 associated with the connection area, and/or the user device 110 may be configured to transmit the asset identifier data and sort location identified data indicative of the identity of the proximate sort location to the control system 100. For example, such determination may be made based at least in part on the location of the user device 110 relative to a geofence surrounding the sort location and/or one or more location devices 415, the communication signal strength, and/or the like. Thus, although the user device 110 may maintain active connections with each of the plurality of location devices 415, the various system components (e.g., the user device 110, the one or more location devices 415, and/or the control system 100) may be configured to determine the appropriate one or more location devices 415 to receive asset identifier data from the user device 110 based at least in part on the location of the user device.

In various embodiments, the user device 110 may be configured to associate the asset identifier data and the location data prior to a determination whether the first sort location 400 is the appropriate sort location for the asset 10. Alternatively, the user device 110 may be configured to associate the asset identifier data and the location data without determining whether the first sort location 400 is the appropriate sort location for the asset 10. In these and other embodiments, the user device 110 may be configured to receive location data from one or more location devices 415 regarding the associated sort location 400 after entering the associated communication area 405. After receiving the location data from the one or more location devices 415, the user device 110 may be configured to associate the location data and the asset identifier data. In various embodiments, the user device 110 may be configured to transmit the associated location data and asset identifier data to one or more databases for storage. Alternatively, the user device 110 may be configured to transmit an indication regarding the association between the asset identifier data and the location data to a control system 100, which may be configured to update data stored in one or more associated databases to reflect the association between the asset identifier data and the location data.

The user device 110 may be further configured to generate one or more alerts regarding the association between the asset identifier data and the location data. The user device 110 may be configured to generate an alert to inform the user 5 (e.g., sort personnel) or other users regarding asset identifier data being associated with location data. As a non-limiting example, the user device 110 may be configured to cause a message to be displayed in order to notify the user 5 that asset identifier data corresponding to an asset 10 has been associated with location data corresponding to a sort location. Thus, the user device 110 may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

B. Exemplary Location Device Operation

In various embodiments, each sort location may be associated with a plurality of location devices 415 embodied as wireless beacons each configured to broadcast data indicative of the identity of the associated sort location 400 such that the user device 110 may receive such broadcast data. Accordingly, each location device 415 may be configured to establish a one-way communication connection with a user device 110 such that each of the location devices 415 may transmit data, but not receive data from the user device 110. For example, each location device 415 may be configured to transmit data indicative of the identity of the sort location 400 to the user device 110 upon the user device entering the broadcast area of the location device 415. The user device 110 may then be configured to transmit the sort location identity data and/or the asset identity data indicative of the identity of the asset being transported by the user to the control system 100 for additional processing.

Figure 6:
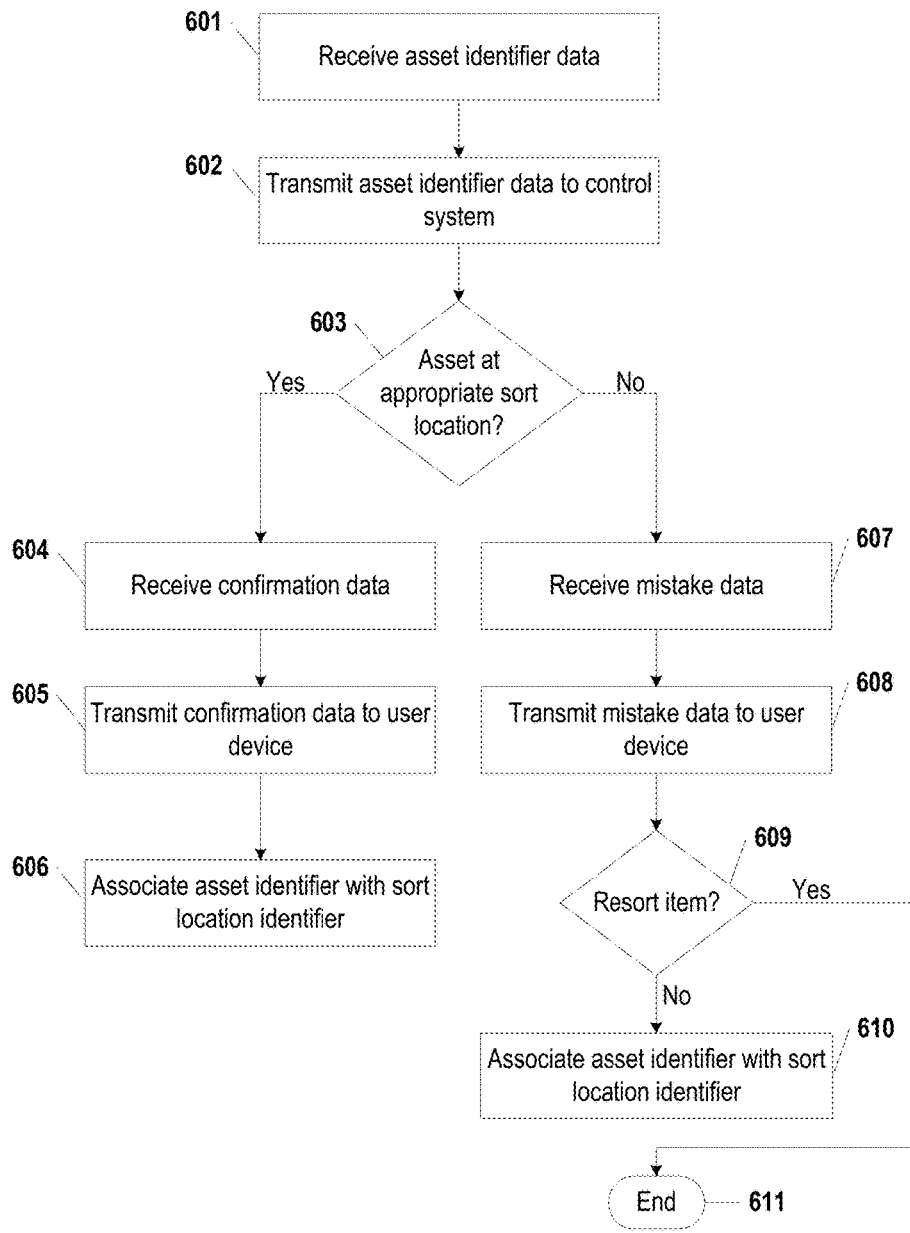
FIG. 6 is a flowchart illustrating operations and processes performed by a location device according to one embodiment of the present invention.

Alternatively, each location device 415 may be configured to transmit and/or receive data from the user device 110 and/or the control system 100. FIG. 6 illustrates exemplary steps carried out by a location device 415 according to various embodiments of the present invention. As illustrated in FIG. 6, each location device 415 may receive asset identifier data at Block 601. The asset identifier data may be transmitted to one or more location devices 415 from a user device 110. As previously described, the asset identifier data may comprise a unique asset identifier, such as a tracking code or other unique identifier. Alternatively or additionally, the asset identifier data may comprise origin identifying data (e.g., origin address, shipper identity, and/or the like), destination identifying data (e.g., destination address, recipient identity, and/or the like), service level data (e.g., Same Day shipping, Next Day Air, Second Day Air, 3 Day Select, Ground shipping, and/or the like), and/or the like. Moreover, in various embodiments, the asset identifier data may comprise more detailed data regarding the asset 10 to be sorted, such as sort locations 400 for each intermediate shipping point. In various embodiments, the asset identifier data may be updated at various times during the shipping process. For example, after determining an appropriate sort location for the asset 10 to be sorted (a process described in greater detail herein), the asset identifier data may be updated to reflect the appropriate sort location. Alternatively, the asset identifier data may be fixed after being created, such that it is not updated with new and/or alternative information during shipment.

In various embodiments, each location device 415 may be configured to receive asset identifier data from a user device 110 after establishing a communication connection with the user device 110. In various embodiments, a connection (e.g., a two-way communication connection) between the location device 415 and the user device 110 may only be established upon the user device 110 entering the communication area 405 associated with the location device 415. As a non-limiting example, the size, shape, and location of the communication area 405 may be based on any number of factors, such as, for example, the effective communication range of the communication protocol utilized. Alternatively or additionally, the size, shape, and location of the communication area 405 may be based on other factors, such as the distance between sort locations 400, and/or the distance between the intake location 450 (e.g., an unsorted location) and the sort locations 400. As previously noted, the location device 415 may be configured to initiate a connection with a user device 110 only after the user device enters the predetermined communication area 405 defined by, for example, a geofence.

In various embodiments, the location device 415 may be configured to transmit at least a portion of the received asset identifier data to the control system 100 at Block 602. The control system 100 may be configured to determine the appropriate sort location for the asset 10 based at least in part on the asset identifier information received from the location device 415. Alternatively, the location device 415 may be configured to determine whether the sort location 400 associated with the location device is the appropriate sort location for the asset 10. As a non-limiting example, where the asset identifier data comprises data indicating an appropriate sort location, the location device 415 may be configured to compare the appropriate sort location indicated by the asset identifier data and the sort location 400 associated with the location device 415 to determine whether there is a match. As indicated at Block 603, the remaining steps to be completed may be selected based at least in part on a determination of whether the location device 415 corresponds to the appropriate sort location.

Upon a determination that the sort location 400 associated with the location device 415 is not the determined appropriate sort location, the location device is configured to receive mistake data at Block 607. As indicated herein, the mistake data may indicate that the user device 110 is proximate the incorrect sort location 400. Alternatively, the location device 415 may be configured to generate mistake data based upon a determination that the user device 110 is proximate an incorrect sort location 400 for the asset 10.

At Block 608, the location device 415 may be configured to transmit the mistake data to the user device 110. As indicated herein, the user device 110 may be configured to generate an indication discernible by the user 5 that the proximate sort location 400 (i.e., the sort location associated with the location device 415) is not the determined appropriate sort location for the asset 10. The user 5 (e.g., sort personnel) may then continue transporting the asset 10 (and consequently the user device 110) to another sort location 400 at Block 609, and the process ends at Block 611. In various embodiments, the process may begin again for a second (or subsequent) set of one or more location devices 415 upon the user device 110 entering a second (or subsequent) communication area 405 associated with the second set of one or more location devices. Alternatively, the user 5 (e.g., sort personnel) may deposit the asset 10 at the sort location 400 associated with the location device 415, and the location device may associate the asset identifier data with sort location identifier data at Block 610. As a non-limiting example, the location device 415 may associate the asset identifier data with the sort location identifier data upon the occurrence of a triggering event. As non-limiting examples, such triggering event may include determining that the communication signal between the user device 110 and the one or more location devices 415 does not satisfy the signal criteria; receiving asset identifier data from the user device 110 while the user device is located within the communication area 405; determining that the user device 110 remains in the communication area 405 for a predetermined amount of time; receiving user input (e.g., pressing a specific key on the user device 110); and/or the like.

Referring again to Block 603, the process may proceed after transmission of the asset identifier data to the control system 100 (illustrated as Block 602) with reference to Blocks 604-606 if the user 5 approaches the appropriate sort location. Upon a determination that the sort location 400 associated with the location device 415 is the appropriate sort location, the location device may be configured to receive confirmation data at Block 604. As indicated herein, the confirmation data may indicate that the user device 110 is proximate the appropriate sort location. Alternatively, the location device 415 may be configured to generate confirmation data based upon a determination that the user device 110 is proximate the appropriate sort location for the asset 10.

At Block 605, the location device 415 may be configured to transmit the confirmation data to the user device 110. As indicated herein, the user device 110 may be configured to generate an indication discernible by the user 5 that the proximate sort location 400 (i.e., the sort location 400 associated with the location device 415) is the determined appropriate sort location for the asset 10. The user 5 (e.g., sort personnel) may then deposit the asset 10 at the appropriate sort location. At Block 606, the location device 415 may associate the asset identifier data with sort location identifier data upon the occurrence of a triggering event. As non-limiting examples, the triggering event may be the expiration of a predetermined amount of time after receiving or generating confirmation data, the reception of asset identifier data while the user device 110 is within the communication area 405, the reception of user input via the user device 110, and/or the like.

The location device 415 may have any of a variety of different configurations. As a non-limiting example, the location device 415 may not transmit or receive data (e.g., asset identifier data and/or data identifying the appropriate sort location) from the control system 100. Instead, the location device 415 may be configured to communicate (e.g., broadcast) the identity of the sort location 400 associated with the location device to the user device 110, and the user device 110 and/or the control system 100 may be configured to determine whether the sort location 400 is the appropriate sort location. Moreover, the location device 415 may not be configured to associate asset identifier data with sort location identifier data. In various embodiments, the location device 415 may be configured to only transmit indications to the user device 110 upon a determination that the user device 110 is proximate an incorrect sort location 400. As yet another alternative, the location device 415 may be configured to provide indications directly to the user 5 regarding whether the associated sort location 400 is the appropriate sort location. As a non-limiting example, the location device 415 may cause a sound to be emitted from an associated output device, or may cause a light to be illuminated based on the determination of whether the associated sort location 400 is the appropriate sort location for the asset 10.

In various embodiments, the location device 415 may be configured to associate the asset identifier data and the location data prior to a determination whether the first sort location 400 is the appropriate sort location for the asset 10. Alternatively, the location device 415 may be configured to associate the asset identifier data and the location data without determining whether the first sort location 400 is the appropriate sort location for the asset 10. In these and other embodiments, the location device 415 may be configured to receive asset identifier data from a user device 110 regarding an asset after the user device 110 enters the communication area 405 associated with the location device 415. After receiving the asset identifier data from the user device 110, the location device 415 may be configured to associate the location data and the asset identifier data. In various embodiments, the location device 415 may be configured to transmit the associated location data and asset identifier data to one or more databases for storage. Alternatively, the location device 415 may be configured to transmit an indication regarding the association between the asset identifier data and the location data to a control system 100, which may be configured to update data stored in one or more associated databases to reflect the association between the asset identifier data and the location data.

The location device 415 may be further configured to generate one or more alerts regarding the association between the asset identifier data and the location data. The location device 415 may be configured to generate an alert to inform the user 5 (e.g., sort personnel) or other users regarding asset identifier data being associated with location data. As a non-limiting example, the location device 415 may be configured to cause a message to be displayed via the user device 110 in order to notify the user 5 that asset identifier data corresponding to an asset 10 has been associated with location data corresponding to a sort location. Thus, the location device 415 may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

C. Exemplary Control System Operation

Figure 7:
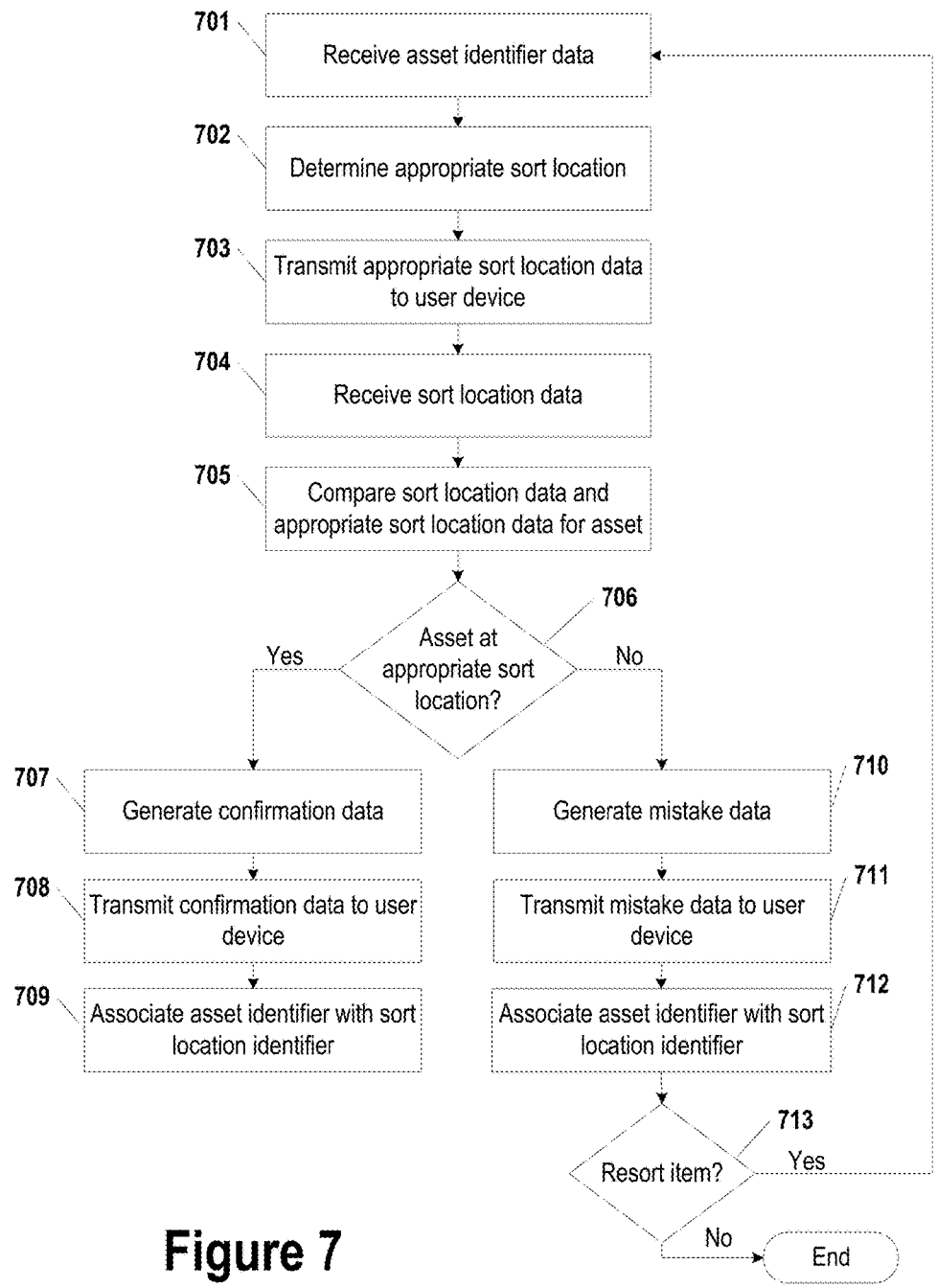
FIG. 7 is a flowchart illustrating operations and processes performed by a control system according to one embodiment of the present invention.

FIG. 7 illustrates exemplary steps carried out by the control system 100 according to various embodiments of the present invention. As illustrated in FIG. 7, the control system 100 may receive asset identifier data at Block 701. As indicated herein, the asset indicator data may be received from the user device 110 and/or the one or more location devices 415.

The asset identifier data may comprise a unique asset identifier, such as a tracking code or other unique identifier. Alternatively or additionally, the asset identifier data may comprise origin identifying data (e.g., origin address, shipper identity, and/or the like), destination identifying data (e.g., destination address, recipient identity, and/or the like), service level data (e.g., Same Day shipping, Next Day Air, Second Day Air, 3 Day Select, Ground shipping, and/or the like), and/or the like. Moreover, in various embodiments, the asset identifier data may comprise more detailed data regarding the asset 10 to be sorted, such as sort locations 400 for each intermediate shipping point. In various embodiments, the asset identifier data may be updated at various times during the shipping process. For example, after determining an appropriate sort location for the asset 10 to be sorted (a process described in greater detail herein), the asset identifier data may be updated to reflect the appropriate sort location. Alternatively, the asset identifier data may be fixed after being created, such that it is not updated with new and/or alternative information during shipment.

At Block 702, the control system 100 may be configured to determine the appropriate sort location for the asset 10. In various embodiments, the determination of the appropriate sort location for the asset 10 may be based at least in part on the received asset identifier data. Moreover, the control system 100 may utilize sort location data corresponding to each of the sort locations 400 to determine whether any subsequent processing to be performed on assets 10 at each sort location 400 will move the asset 10 closer to its final destination. As a non-limiting example, the control system 100 may determine the appropriate sort location for an asset 10 to be delivered to 123 Main Street, Atlanta, Ga. is the delivery vehicle that will deliver other assets 10 to 123 Main Street, Atlanta, Ga. As a second non-limiting example, the control system 100 may determine the appropriate sort location for an asset 10 to be delivered to 345 Broad Street, Los Angeles, Calif. via Next Day Delivery is a pallet to be loaded onto a plane destined for Los Angeles, Calif. As yet another alternative, the control system 100 may be configured to identify a sort location 400 previously assigned to the asset 10.

Referring again to FIG. 7, at Block 703 the control system 100 may be configured to transmit data identifying the appropriate sort location to the user device 110. As noted herein, the user device 110 may be configured to generate an indication discernible by the user 5 (e.g., sort personnel) regarding the appropriate sort location for the asset 10. However, as noted herein, each asset 10 may have information indicative of an appropriate sort location printed thereon, and accordingly the control system 100 may not transmit appropriate sort location data to the user device 110 for display to the user 5.

The control system 100 may be configured to receive sort location data from the user device 110 and/or the location device 415 upon the user device entering the communication area 405 corresponding to the location device 415 at Block 704. At Block 705, the control system 100 may subsequently compare the appropriate sort location and the sort location data received at Block 704 to determine whether the user device 110 is proximate the appropriate sort location. As indicated at Block 706, the remaining steps to be completed may be selected based at least in part on a determination of whether the location device 415 corresponds to the appropriate sort location.

Upon a determination that the user device 110 is proximate an incorrect sort location 400, the control system 100 may generate mistake data at Block 710. Upon generating the mistake data, the control system 100 may transmit the mistake data to the user device 110 and/or the location device 415 at Block 711. As indicated herein, the user device 110 and/or the location device 415 may be configured to generate a message discernible by the user 5 (e.g., sort personnel) indicating the user device 110 is proximate an incorrect sort location 400. In various embodiments, the control system 100 may be configured to associate the asset identifier data with the sort location data corresponding to the sort location 400 at Block 712. In various embodiments, the control system 100 may be configured to associate the asset identifier data with the sort location data upon the occurrence of a triggering event. Exemplary triggering event may comprise, reading, scanning, or otherwise receiving asset identifier data (e.g., via the indicia reader device) while the user device 110 is in the communication area 405, receiving asset identifier data regarding a second asset 10, receiving user input via the user device 110, and/or the like.

At Block 713, the user 5 may continue transporting the asset 10 (and consequently the user device 110) to another sort location 400. The process may return to Block 701 and repeat the recited steps. In various embodiments, the user may be required to rescan the indicia of the asset with the user device 110, and accordingly the control system 100 may receive the asset identifier data from the user device 110 as illustrated in Block 701. Alternatively, the user 5 (e.g., sort personnel) may deposit the asset 10 at the incorrect sort location 400, and process may end.

Referring again to Block 706, the process may proceed after comparing the sort location data and the appropriate sort location data for the asset 10 (illustrated as Block 705) with reference to Blocks 707-709 if the user 5 approaches the appropriate sort location. Upon a determination that the user device 110 is proximate the appropriate sort location, the control system 100 may be configured to generate confirmation data at Block 707. The control system 100 may be configured to then transmit the confirmation data to user device 110 and/or the location device 415 at Block 708. As indicated herein, the user device 110 and/or the location device 415 may generate a message discernible by the user 5 (e.g., sort personnel) indicating that the user device 110 is proximate the appropriate sort location for the asset 10.

At Block 708, the control system 100 may be configured to associate the asset identifier data with the sort location data corresponding to the sort location 400. In various embodiments, the control system 100 may be configured to associate the asset identifier data with the sort location data upon the occurrence of a triggering event. Such triggering event may be, for example, a determination that the user device 110 is no longer in communication with the one or more location devices 415 (e.g., upon a determination that the communication connection between the user device 110 and one or more location devices 415 does not meet the signal criteria), reading, scanning, or otherwise receiving asset identifier data (e.g., via the indicia reader device) while the user device 110 is in the communication area 405, after receiving asset identifier data regarding a second asset 10, and/or otherwise after a triggering event.

In various embodiments, the control system 100 may be configured to associate the asset identifier data and the location data prior to a determination whether the first sort location 400 is the appropriate sort location for the asset 10. Alternatively, the control system 100 may be configured to associate the asset identifier data and the location data without determining whether the first sort location 400 is the appropriate sort location for the asset 10. In these and other embodiments, the control system 100 may be configured to receive asset identifier data and location data from a location device 415 and/or a user device 110. After receiving the asset identifier data and the location data, the control system 100 may be configured to associate the location data and the asset identifier data. In various embodiments, the control system 100 may be configured to transmit the associated location data and asset identifier data to one or more databases for storage.

The control system 100 may be further configured to generate one or more alerts regarding the association between the asset identifier data and the location data. The control system 100 may be configured to generate an alert to inform the user 5 (e.g., sort personnel) or other users regarding asset identifier data being associated with location data. As a non-limiting example, the control system 100 may be configured to cause a message to be displayed via the user device 110 in order to notify the user 5 that asset identifier data corresponding to an asset 10 has been associated with location data corresponding to a sort location. Thus, the control system 100 may facilitate a determination that asset identifier data has been incorrectly associated with location data, and may therefore facilitate the correction of an inappropriate association. For example, based upon the generated alert, the user 5 may determine that the asset identification data was incorrectly associated with a location data corresponding to a first sort location 400.

VI. EXEMPLARY USE

Referring again to FIG. 4, shown is a schematic of an example sort facility in which assets 10 are moved by a user 5 (e.g., sort personnel) from an intake location 450 (e.g., a conveyor belt moving unsorted assets 10 into the sort facility) to one of a plurality of sort locations 400.

As shown in FIG. 4, a user 5 may remove an asset 10 from an intake location 450 and scan, read, or otherwise obtain an asset indicia from the asset 10 using the user device 110. The user device 110 may receive and store asset identifier data based at least in part on the information received from the asset indicia. The user 5 may then transport (e.g., carry) the asset 10 and the user device 110 away from the intake location 450 and to one of the plurality of sort locations 400. As the user 5 nears a sort location 400, and thus enters the communication area 405, the user device 110 may receive sort location identifier data from one or more location devices 415 associated with the proximate sort location 400 (illustrated by the dashed line connecting the user device 110 and location device 415 in FIG. 4). Upon receipt of sort location identifier data from one or more location devices 415, the user device 110 may determine whether the signals received from the one or more location devices 415 satisfy signal criteria. For example, the user device 110 may determine whether the signal received from each of the plurality of location devices 415 satisfies a predetermined signal strength threshold and/or may determine whether wireless signals are received from at least a minimum number of location devices 415 broadcasting data regarding a single sort location. Upon a determination that the signal received from the plurality of location devices 415 satisfies each of the signal criteria, the user device 110 may transmit asset identity data and sort location identity data to the control system 100 to determine whether the user device 110 is proximate the appropriate sort location for the asset.

Alternatively, upon entering the communication area 405, the user device 110 may transmit the stored asset identifier data to the one or more location devices 415 (illustrated by the dashed line connecting the user device 110 and location device 415 in FIG. 4). As yet another alternative, at least one of the user device 110 or the location device 415 may transmit asset identifier data and/or location data to the control system 100 (illustrated by the dashed lines connecting the user device 110 to the control system 100 and location device 415 to the control system in FIG. 4). At least one device (e.g., the user device 110, location device 415, and/or the control system 100) may determine the appropriate sort location for the asset 10, and may compare the sort location identifier data corresponding to the proximate sort location 400 and the appropriate sort location. Upon a determination that the proximate sort location 400 is not the appropriate sort location, the user device 110 and/or the location device 415 may be configured to generate an alert to notify the user 5 that the asset 10 should not be placed at the proximate sort location 400.

Upon a determination that the proximate sort location 400 is the appropriate sort location, the user device 110 and/or the location device 415 may be configured to generate an alert to notify the user 5 that the asset 10 should be placed at the proximate sort location 400. The user device 110 may then be configured to await a triggering event before preparing to receive asset identifier data regarding a second asset 10 to be sorted. As a non-limiting example, the triggering event may be a determination by the user device 110 that the communication signal between the user device 110 and the one or more location devices 415 no longer satisfies the signal criteria. As another example, the user 5 may scan, read, or otherwise obtain the asset indicia for the asset 10 while the user device 110 remains in the connection area 405, and/or may supply a user input via the user device 110. Alternatively, the triggering event may be the expiration of a predefined period of time after the user device 110 receives data indicating that the proximate sort location 400 is the appropriate sort location for the asset 10. As yet another example triggering event, the user device 110 may be configured to prepare to receive asset identifier data regarding a second asset 10 only after scanning, reading, or otherwise obtaining an asset indicia corresponding to the second asset 10. In various embodiments, the user device 110 may be configured to clear the asset identifier data regarding the asset 10 from the user device memory upon the occurrence of the triggering event.

Moreover, in various embodiments, at least one device (e.g., the user device 110, the location device 415, and/or the control system 100) may be configured to associate the location data and the asset identifier data. After the user device 110 enters the communication area 405, the at least one device may be configured to associate the location data corresponding to the sort location associated with the communication area 405 with the asset identifier data corresponding to the asset 10 linked or associated with the user device 110. In various embodiments, the at least one device may be configured to associate the location data and the asset identifier data upon the occurrence of a triggering event. Additionally or alternatively, the at least one device may be configured to associate the location data and the asset identifier data after determining that the proximate sort location 400 (e.g., the sort location corresponding to the communication area 405 in which the user device 110 is present) is the appropriate sort location for the asset 10.

After depositing the asset 10 at a sort location 400, the user 5 may return to the intake location 450 with the user device 110 and begin the above described method for a second asset 10 to be sorted.

V. CONCLUSION

Many modifications and other embodiments of the inventions set forth herein will come to mind to one skilled in the art to which these inventions pertain having the benefit of the teachings presented in the foregoing descriptions and the associated drawings. For example, various embodiments may be configured to associate a plurality of assets with a particular sort location. In such embodiments, a sort employee may scan a plurality of asset identifiers (e.g., sequentially) before transporting the plurality of items to a sort location. Thereafter, the plurality of assets may be associated with the proximate sort location according to the features and methods described herein. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising (a) a user device comprising one or more memory storage areas and one or more processors and (b) one or more location devices comprising one or more memory storage areas and one or more processors, the location devices associated with a sort location; wherein:
    the one or more location devices are configured to:
        store location data indicative of the identity of the sort location;
and
    broadcast at least a portion of the location data; and
    the user device is configured to:
        receive asset identifier data from an asset indicia, wherein the asset indicia is associated with an asset;
        store the asset identifier data corresponding to the asset; and
        upon being brought within a communication area associated with the sort location, receive the broadcast portion of the location data from the one or more location devices;
        after receiving at least a portion of the location data broadcast from the one or more location devices, associate the asset identifier data and the location data;
        upon a first determination that the sort location is not an appropriate sort location for the asset, generate mistake data indicative of the first determination;
        upon a second determination that the sort location is the appropriate sort location for the asset, generate confirmation data indicative of the second determination; and
        display the data indicative of the determination.

2. The system of claim 1, wherein:
    the user device is further configured to, at least one of:
        after receiving at least a portion of the location data broadcast from the one or more location devices, receive the data indicating whether the sort location is the appropriate sort location for the asset; or
        after receiving at least a portion of the location data transmitted from the one or more location devices, determine whether the sort location is the appropriate sort location for the asset.

3. The system of claim 1, wherein the user device is further configured to: upon being brought within a communication area associated with the sort location, establish a communication connection with the one or more location devices.

4. The system of claim 2, wherein the user device is further configured to generate an alert indicating that the sort location is not the appropriate sort location upon a determination that the sort location is not the appropriate sort location.

5. The system of claim 2, wherein the user device is further configured to generate an alert indicating that the sort location is the appropriate sort location upon a determination that the sort location is the appropriate sort location.

6. A system comprising (a) a user device comprising one or more memory storage areas and one or more processors and (b) one or more location devices comprising one or more memory storage areas and one or more processors, the location devices associated with a sort location; wherein:
    the user device is configured to:
        receive asset identifier data from an asset indicia, wherein the asset indicia is associated with an asset;
        store the asset identifier data corresponding to the asset; and
        upon a determination that the sort location is not an appropriate sort location, generating an alert indicating that the sort location is not the appropriate sort location;
        upon a determination that the sort location is an appropriate sort location, generating an alert indicating that the sort location is the appropriate sort location;
        display the data indicative of the determination;
        upon being brought within a communication area associated with the sort location, transmitting at least a portion of the asset identifier data to the one or more location devices;
    the one or more location devices are configured to:
        store location data indicative of the identity of the sort location;
        receive at least a portion of the asset identifier data transmitted from the user device; and
        after receiving at least a portion of the asset identifier data transmitted from the user device, transmit the asset identifier data and the location data.

7. The system of claim 6, wherein:
    the one or more location devices are further configured to, at least one of: after
        receiving at least a portion of the asset identifier data transmitted from the user device, receive data indicating whether the sort location is an appropriate sort location for the asset; or
        after receiving at least a portion of the asset identifier data transmitted from the user device, determine whether the sort location is the appropriate sort location for the asset.

8. The system of claim 6, further comprising:
a control system operatively connected to at least one location device, the control system comprising:
a control system memory; and
one or more control system computer processors configured to:
receive the transmitted portion of the asset identifier data and the location data;
determine, based at least in part on the received asset identifier data and the location data, whether the sort location is the appropriate sort location for the asset;
upon a determination that the sort location is not the appropriate sort location for the asset, generate mistake data indicative of the determination;
upon a determination that the sort location is the appropriate sort location for the asset, generate confirmation data indicative of the determination; and
transmit the generated mistake data or confirmation data to the location device.

9. The system of claim 6, wherein the user device is further configured to: upon being brought within a communication area associated with the sort
location, establish a communication connection with the location device.

10. The system of claim 7, wherein the one or more location devices are further configured to generate an alert indicating that the sort location is not the appropriate sort location upon a determination that the sort location is not the appropriate sort location.

11. The system of claim 7, wherein the one or more location devices are further configured to generate an alert indicating that the sort location is the appropriate sort location upon a determination that the sort location is the appropriate sort location.

12. The system of claim 8, wherein the one or more control system computer processors are further configured to generate an alert indicating that the sort location is not the appropriate sort location upon a determination that the sort location is not the appropriate sort location.

13. The system of claim 8, wherein the one or more control system computer processors are further configured to generate an alert indicating that the sort location is the appropriate sort location upon a determination that the sort location is the appropriate sort location.

14. A computer-implemented method for associating a sorted asset with a sort location, the method comprising steps configured for:
storing, at one or more location devices associated with the sort location, location data indicative of the identity of the sort location, wherein each of the one or more location devices are configured for wireless communication within communication areas corresponding to each of the one or more location devices;
monitoring, via the one or more location devices, the communication areas corresponding to each of the one or more location devices for the presence of a handheld user device carried by a user and having asset identifier data indicative of the identity of an asset stored thereon;
upon determining that a user device is located within one or more communication areas corresponding to one or more location devices, associating the asset identifier data stored on the user device with the location data;
upon a determination that the sort location is not an appropriate sort location, generating an alert indicating that the sort location is not the appropriate sort location;
upon a determination that the sort location is an appropriate sort location, generating an alert indicating that the sort location is the appropriate sort location; and
display the data indicative of the determination.

15. The computer-implemented method for associating a sorted asset with a sort location of claim 14, further comprising steps for:
determining the appropriate sort location for the asset; and
after determining that the user device is located within one or more communication areas corresponding to one or more location devices, determining whether the sort location associated with the one or more location devices is the appropriate sort location.

16. The computer-implemented method for associating a sorted asset with a sort location of claim 14, further comprising steps for:
after determining that the user device is located within one or more communication areas corresponding to one or more location devices, receiving the asset identifier data for the asset from the user device.

17. The computer-implemented method for associating a sorted asset with a sort location of claim 14, further comprising steps for:
after determining that the user is located within one or more communication areas corresponding to one or more location devices, transmitting location identifier data regarding the sort location from at least one of the one or more location devices associated with the sort location to the user device.

18. The computer-implemented method for associating a sorted asset with a sort location of claim 14, further comprising steps for:
after determining that the user device is located within one or more communication areas corresponding to one or more location devices, establishing a communication connection between the user device and at least one of the one or more location devices associated with the sort location.

* * * * *

UNITED STATES PATENT AND TRADEMARK OFFICE
CERTIFICATE OF CORRECTION

PATENT NO. : 10,281,555 B2
APPLICATION NO. : 15/239286
DATED : May 7, 2019
INVENTOR(S) : Scott Alan Loverich et al.

It is certified that error appears in the above-identified patent and that said Letters Patent is hereby corrected as shown below:

On the Title Page

Page 3 Column 1 (item (56) Other Publications), Line 32: Please remove "solutions/" and replace with --solutions.--.

Signed and Sealed this
Twenty-fifth Day of June, 2019

Andrei Iancu
*Director of the United States Patent and Trademark Office*